(12) United States Patent
Bin Redhwan et al.

(10) Patent No.: US 11,683,731 B2
(45) Date of Patent: Jun. 20, 2023

(54) FIRST NETWORK NODE, SECOND NETWORK NODE, WIRELESS DEVICE AND METHODS PERFORMED THEREBY FOR HANDLING A LINK SWITCH

(71) Applicant: Telefonaktiebolaget LM Ericsson (publ), Stockholm (SE)

(72) Inventors: Sakib Bin Redhwan, Linköping (SE); Pradeepa Ramachandra, Linköping (SE); Reza Moosavi, Linköping (SE); Nicklas Johansson, Brokind (SE); Icaro L. J. Da Silva, Solna (SE); Sofia Ek, Uppsala (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 65 days.

(21) Appl. No.: 17/259,838

(22) PCT Filed: Jul. 4, 2019

(86) PCT No.: PCT/SE2019/050667
§ 371 (c)(1),
(2) Date: Jan. 12, 2021

(87) PCT Pub. No.: WO2020/036524
PCT Pub. Date: Feb. 20, 2020

(65) Prior Publication Data
US 2022/0201561 A1 Jun. 23, 2022

Related U.S. Application Data

(60) Provisional application No. 62/765,000, filed on Aug. 17, 2018.

(51) Int. Cl.
*H04W 36/00* (2009.01)
*H04W 36/08* (2009.01)

(52) U.S. Cl.
CPC ... *H04W 36/0061* (2013.01); *H04W 36/0058* (2018.08); *H04W 36/00837* (2018.08); *H04W 36/08* (2013.01)

(58) Field of Classification Search
CPC ............. H04W 36/08; H04W 36/0058; H04W 36/0061; H04W 36/00837;
(Continued)

(56) References Cited

U.S. PATENT DOCUMENTS

2010/0124201 A1* 5/2010 Griot ..................... H04W 36/06
370/331
2014/0112184 A1* 4/2014 Chai .................. H04W 36/0085
370/252
(Continued)

FOREIGN PATENT DOCUMENTS

WO 2018132051 A1 7/2018

OTHER PUBLICATIONS

International Search Report and Written Opinion dated Sep. 19, 2019 for International Application No. PCT/SE2019/050667 filed on Jul. 4, 2019, consisting of 11-pages.
(Continued)

*Primary Examiner* — Kan Yuen
(74) *Attorney, Agent, or Firm* — Christopher & Weisberg, P.A.

(57) ABSTRACT

A method, performed by a network node. The method is for handling a switch of a wireless device from a source to a target link. The network node and the device operate in a wireless communications network. Given a configuration of the target link indicating resources to perform random access to the network node during the switch, the network node, transmits, prior to the switch, an indication to the device. The indication indicates an update to the configuration. The network node changes the configuration of the
(Continued)

target link, based on the update. The changing is performed only after receiving a confirmation of at least one of: i) from the device, that the device has received the indication, and ii) from a first network node operating in the wireless communications network, that it has transmitted the indication to the device.

6 Claims, 13 Drawing Sheets

(58) Field of Classification Search
CPC ......... H04W 36/0072; H04W 36/0077; H04W 36/0085; H04W 74/0833; H04W 74/0841
See application file for complete search history.

(56) References Cited

U.S. PATENT DOCUMENTS

| | | | | |
|---|---|---|---|---|
| 2017/0215224 A1* | 7/2017 | Ke | .................. | H04W 76/32 |
| 2018/0007591 A1* | 1/2018 | Xu | .................. | H04W 76/34 |
| 2019/0223057 A1* | 7/2019 | Park | .................. | H04W 76/27 |
| 2019/0297537 A1* | 9/2019 | Tsai | .................. | H04W 72/14 |
| 2019/0335369 A1* | 10/2019 | Zhang | .............. | H04W 36/0072 |
| 2020/0275325 A1* | 8/2020 | Li | .................. | H04W 76/27 |
| 2020/0374767 A1* | 11/2020 | Kuang | .............. | H04W 74/0833 |
| 2021/0068016 A1* | 3/2021 | Shi | .................. | H04W 36/08 |

OTHER PUBLICATIONS

3Gpp TSG-RAN WG2 #97bis R2-1703384; Title: Analysis on conditional handover; Source: Huawei, HiSilicon; Agenda Item: 10.2.4.4; Document for: Discussion and decision: Date and Location: Apr. 3-7, 2017, Spokane, USA, consisting of 7-pages.

3GPP TS 38.331 V15.2.0; 3rd Generation Partnership Project; Technical Specification Group Radio Access Network; NR; Radio Resource Control (RCC) protocol specification (Release 15), Jun. 2018, consisting of 304-pages.

3GPP TS 36.331 V15.2.0; 3rd Generation Partnership Project; Technical Specification Group Radio Access Network; Evolved Universal Terrestrial Radio Access (E-UTRA); Radio Resource Control (RRC); Protocol specification (Release 15), Jun. 2018, consisting of 791-pages.

3GPP TSG-RAN WGZ #101 R2-1803336; Title: Conditional Handover; Source: Ericsson; Agenda Item: 10.2.7; Document for: Discussion, Decision; Date and Location: Feb. 26-Mar. 2, 2018, consisting of 6-pages.

* cited by examiner a)

b)

a)

b)

a)

b)

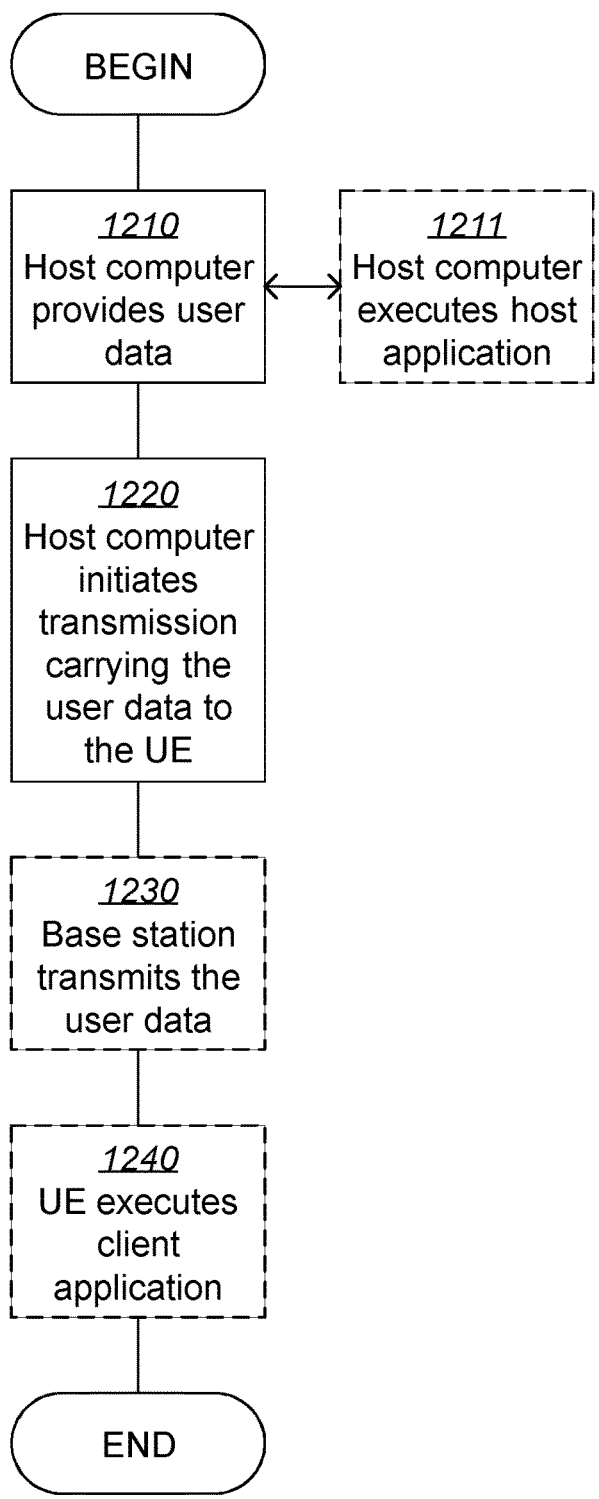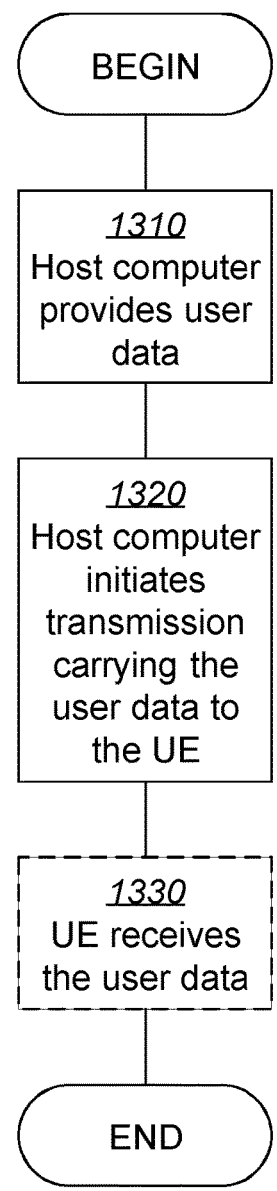
FIG. 12
FIG. 13

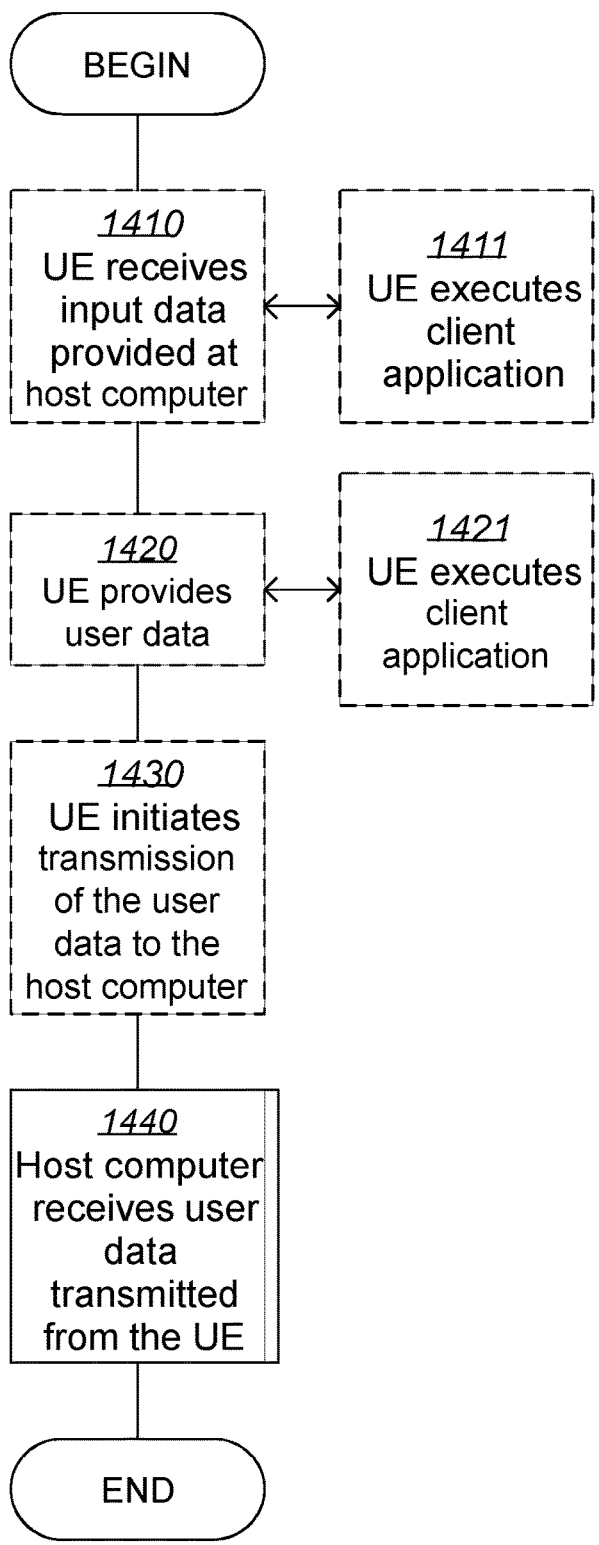
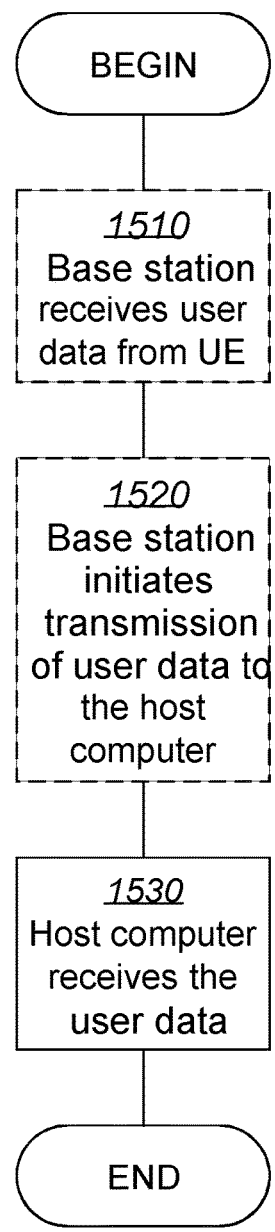
FIG. 14
FIG. 15

FIRST NETWORK NODE, SECOND NETWORK NODE, WIRELESS DEVICE AND METHODS PERFORMED THEREBY FOR HANDLING A LINK SWITCH

CROSS-REFERENCE TO RELATED APPLICATIONS

This application is a Submission Under 35 U.S.C. § 371 for U.S. National Stage Patent Application of International Application No.: PCT/SE2019/050667, filed Jul. 4, 2019 entitled "FIRST NETWORK NODE, SECOND NETWORK NODE, WIRELESS DEVICE AND METHODS PERFORMED THEREBY FOR HANDLING A LINK SWITCH," which claims priority to U.S. Provisional Application No. 62/765,000, filed Aug. 17, 2018, the entireties of both of which are incorporated herein by reference.

TECHNICAL FIELD

The present disclosure relates generally to a first network node, and methods performed thereby, for handling a link switch of a wireless device from a source link to a target link. The present disclosure also relates generally to a second network node, and methods performed thereby, for handling the link switch of the wireless device from the source link to the target link. The present disclosure additionally relates generally to a wireless device, and methods performed thereby, for handling the link switch of the wireless device from the source link to the target link.

BACKGROUND

Communication devices within a wireless communications network may be wireless devices such as e.g., User Equipments (UEs), stations (STAs), mobile terminals, wireless terminals, terminals, and/or Mobile Stations (MS). Wireless devices are enabled to communicate wirelessly in a cellular communications network or wireless communication network, sometimes also referred to as a cellular radio system, cellular system, or cellular network. The communication may be performed e.g., between two wireless devices, between a wireless device and a regular telephone, and/or between a wireless device and a server via a Radio Access Network (RAN), and possibly one or more core networks, comprised within the wireless communications network. Wireless devices may further be referred to as mobile telephones, cellular telephones, laptops, or tablets with wireless capability, just to mention some further examples. The wireless devices in the present context may be, for example, portable, pocket-storable, hand-held, computer-comprised, or vehicle-mounted mobile devices, enabled to communicate voice and/or data, via the RAN, with another entity, such as another terminal or a server.

Communication devices may also be network nodes, such as radio network nodes, e.g., Transmission Points (TP). The wireless communications network covers a geographical area which may be divided into cell areas, each cell area being served by a network node such as a Base Station (BS), e.g., a Radio Base Station (RBS), which sometimes may be referred to as e.g., gNB, evolved Node B ("eNB"), "eNodeB", "NodeB", "B node", or BTS (Base Transceiver Station), depending on the technology and terminology used. The base stations may be of different classes such as e.g., Wide Area Base Stations, Medium Range Base Stations, Local Area Base Stations and Home Base Stations, based on transmission power and thereby also cell size. A cell is the geographical area where radio coverage is provided by the base station at a base station site. One base station, situated on the base station site, may serve one or several cells. Further, each base station may support one or several communication technologies. The wireless communications network may also be a non-cellular system, comprising network nodes which may serve receiving nodes, such as wireless devices, with serving beams. In 3rd Generation Partnership Project (3GPP) Long Term Evolution (LTE), base stations, which may be referred to as eNodeBs or even eNBs, may be directly connected to one or more core networks. In the context of this disclosure, the expression Downlink (DL) may be used for the transmission path from the base station to the wireless device. The expression Uplink (UL) may be used for the transmission path in the opposite direction i.e., from the wireless device to the base station.

NR The so-called 5G system, from a radio perspective started to be standardized in 3GPP, and the so-called New Radio (NR) is the name for the radio interface. NR architecture is being discussed in 3GPP. In the current concept, gNB denotes NR BS, where one NR BS may correspond to one or more transmission and/or reception points.

One of the main goals of NR is to provide more capacity for operators to serve ever increasing traffic demands and variety of applications. Because of this, NR will be able to operate on high frequencies, such as frequencies over 6 GHz, until 60 or even 100 GHz. In comparison to the current frequency bands allocated to LTE, some of the new bands will have much more challenging propagation properties such as lower diffraction and higher outdoor and/or indoor penetration losses. As a consequence, signals will have less ability to propagate around corners and penetrate walls. In addition, in high frequency bands, atmospheric and/or rain attenuation and higher body losses render the coverage of NR signals even more spotty.

Fortunately, operation in higher frequencies makes it possible to use smaller antenna elements, which enables antenna arrays with many antenna elements. Such antenna arrays facilitate beamforming, where multiple antenna elements may be used to form narrow beams and thereby compensate for the challenging propagation properties.

Despite the link budget gains provided by beamforming solutions, reliability of a system purely relying on beamforming and operating in higher frequencies may be challenging, since the coverage may be more sensitive to both time and space variations. As a consequence of that, the Signal to Interference and Noise Ratio (SINR) of such a narrow link may drop much quicker than in the case of LTE.

One of the areas that will be particularly affected by the characteristics of NR is handover. Already in LTE, RAN2 observed that the serving cell may not be able to convey the handover command timely. Lowering the Time To Trigger (TTT) and the measurement hysteresis allowed to reduce the handover failure rate, but also resulted in higher ping-pong probability. It is expected that in NR these effects will be even more pronounced when operating at higher frequency bands. Because of these aspects, attention to mobility robustness in NR systems may be needed.

Conditional Handover

One solution discussed in an RAN2 meeting is called "early handover command" or "conditional handover command". In order to avoid the undesired dependence on the serving radio link upon the time, and radio conditions, where the UE may need to execute the handover, NR may offer the possibility to provide Radio Resource Control (RRC) signaling for the handover to the UE earlier. To achieve this, it may be possible to associate the HandOver (HO) command with a condition. As soon as the condition is fulfilled, the UE may execute the handover in accordance with the provided handover command.

Such a condition may e.g., be that the quality of the Mobility Reference Signal (MRS) of the target cell or beam becomes X dB stronger than the MRS of the serving cell. The threshold Y used in a preceding measurement reporting event may then be chosen lower than the one in the handover execution condition. This may be understood to allow the serving cell to prepare the handover upon reception of an early measurement report and to provide the RRCConnectionReconfiguration with mobilityControlInfo at a time when the radio link between the source cell and the UE is still stable. The execution of the handover may be done at a later point in time, and threshold, which may be considered optimal for the handover execution.

FIG. 1 depicts an example of a conditional handover execution with just a serving cell and a target cell, as well as a UE 13. The serving cell is under the control of a serving gNB 11, and the target cell is under the control of a target gNB 12. The serving gNB 11 transmits User Plane (UP) data. At 1, the UE, sends a measurement report to the gNB 11, using a lower threshold than the one in a handover execution condition. Based on the received early measurement report, the gNB 11 makes a handover decision, and at 2, it sends an early HO request to the target gNB 12. The target gNB receives the early HO request, accepts the HO, and builds an RRC configuration. At 3, the target gNB 12 sends a HO acknowledgement message to the serving gNB 11, including the RRC configuration. At 4, the serving gNB 11 sends a conditional HO command to the UE 13 with a high threshold. When the measurements by the UE 13 fulfil the HO condition, the UE 13 triggers the pending conditional HO. At 5, the UE 13 performs synchronization and random access with the target gNB 12, and sends a HO confirm at 6. The target gNB 12 notifies the serving gNB 11 that the HO has been completed at 7, and sends UP data to the UE 13 from that point on. In practice, there often may be many cells or beams that the UE 13 may have reported as possible candidates based on its preceding Radio Resource Management (RRM) measurements. The network may then have the freedom to issue conditional handover commands for several of those candidates. The RRCConnectionReconfiguration for each of those candidates may differ e.g., in terms of the HO execution condition, Reference Signal (RS) to measure and threshold to exceed, as well as in terms of the Random Access (RA) preamble to be sent when a condition is met. As a side note, Mobility Reference Signal (MRS) may be used herein exclusively to denote the reference signal used for mobility purposes. For instance, in NR, MRS may be either Synchronization Signal Block (SSB) or Channel State Information-Reference Signals (CSI-RS).

The RRCConnectionReconfiguration may typically be a "delta" to the UE's current configuration. In LTE, the UE may be required to apply RRCConnectionReconfiguration messages in the order in which it may receive them. On the other hand, Universal Mobile Telecommunications System (UMTS) allowed associating a reconfiguration message with an "Activation Time". The Radio network controller (RNC) configured the target network node to accept a UE at a time in future, a.k.a. the Activation time. It also configured the UE through the source network node to perform handover at the same time. In theory, if both perform the action at the same time, the UE could be connected to the target network node. This led to race conditions and numerous problems when the UE received a first reconfiguration with a longer Activation Time than the Activation Time of a subsequent reconfiguration message. The LTE mechanism may be understood to be simpler and more robust and may be adopted also for NR.

And it may need to be ensured that the "conditional handover" mechanism discussed above does not suffer from similar problems as the activation time problems observed in UMTS.

As explained above, the triggering condition associated with the HO command sent to the UE may need to evaluate measurements and trigger the handover when those conditions may be fulfilled. But since the HO command may typically be a delta to the UE's current RRC configuration, it may be necessary to address how to handle subsequent RRCConnectionReconfiguration messages arriving from the source cell if the UE has not yet executed the handover.

When the UE receives a "conditional HO command", it may interpret the RRCConnectionReconfiguration with mobilityControlInfo as a delta to its current configuration, unless it is a full configuration message. It may in principle determine the target configuration immediately upon reception of the command but it may need to apply or execute it only if the associated condition is fulfilled. While the UE evaluates the condition, it may continue operating per its current RRC configuration, that is, without applying the conditional HO command.

When the UE determines that the condition is fulfilled, it may disconnect from the serving cell, apply the conditional HO command, and connect to the target cell. These steps may be considered equivalent to the current, instantaneous handover execution. Once the UE applies the RRCConnectionReconfiguration including mobilityControlInfo, it may be required to not process any subsequent RRCConnectionReconfiguration messages received prior to the HO execution. The latter is the intended behavior already in LTE.

Enhancements on Conditional Handover

It may happen that the HO condition is not fulfilled for a longer time period and hence, the UE may stay in the source cell. In this case, the source cell may need to have the possibility to perform further reconfigurations either to change the UE operation in the current serving cell or to issue a handover to another target cell. In this scenario, the previously received conditional HO command may not be applied as delta to the new RRCConnectionReconfiguration, as the original conditional HO command was built having current RRC configuration in mind.

Enhancements of conditional handover addressing the above problems have been proposed in WO 2018/132051. To avoid additional signaling between network entities and towards the UE, in the optimized approach, the UE may not discard the conditional HO command when receiving the subsequent RRCConnectionReconfiguration for the serving cell. A summary of the proposed enhancement comprises the following four points.

A first proposed enhancement comprises updating the conditional handover command. According to this enhancement, the network may decide to provide a new, updated RRCConnectionReconfiguration in a conditional HO command for a target cell for which it had previously provided a conditional HO command. Correspondingly, if the UE receives a conditional HO command for a target cell for which it has already a pending conditional HO command, it may determine the target cell configuration based on its current serving cell configuration and the "delta" in the HO command and use it to towards the target cell.

A second proposed enhancement comprises extending the validity of the conditional handover command. The source may ask the target to prolong the conditional HO command validity and, if granted by the target, send a new time limit to the UE for the conditional HO command that may allow more time before the conditional HO command is triggered.

Third, the proposed enhancement comprises changing target cells. The source cell may decide, based on the RRM measurements, that the potential target cell may need to be changed. In this scenario, the source cell may provide the conditional HO command to the UE with a new target cell and indicate that the UE is to discard the earlier provided conditional HO command. Correspondingly, the UE may be prepared to receive simultaneously the cancellation of a previously received pending HO command to a first target cell and a new and/or updated conditional HO command for a second target cell.

Fourth, the proposed enhancement comprises preparing multiple target cells for conditional handover. It may be desirable to provide the UE with HO conditions and configurations for several candidate target cells. When receiving conditional HO commands for multiple target cells, the UE may evaluate HO conditions for more than one candidate target cell, and store configurations for those individually. This may be performed using two alternatives. The network may inform, in the conditional HO command, that the RRCConnectionReconfiguration in the conditional HO command is applicable for several cells. The same conditional HO command may apply to multiple cells. When the UE receives this kind of conditional HO command, it may store only one configuration associated with multiple target cells. Alternatively, the network may provide conditional HO command with multiple cells and potentially multiple configurations. When receiving such configuration, the UE may store the current serving cell RRC configuration, e.g., the RRC context. When the HO is triggered, the UE may derive the corresponding target cell configuration based on said source cell configuration stored upon reception of the HO command and the parameters provided in the conditional HO command.

In spite of the fact that reconfiguration of resources in conditional handover is intended to provide improved handover operation, the existing methods of performing such reconfiguration may lead to radio link failure.

SUMMARY

It is an object of embodiments herein to improve the handling of a link switch of a wireless device from a source link to a target link in a wireless communications network.

According to a first aspect of embodiments herein, the object is achieved by a method performed by a network node. The method is for handling a link switch of a wireless device from a source link to a target link. The network node and the wireless device operate in a wireless communications network. Given a first configuration of the target link indicating resources for the wireless device to perform random access to the network node during the link switch from the source link to the target link, the network node transmits, prior to the link switch, an indication to the wireless device. The indication indicates an update to the first configuration. The network node also changes the first configuration of the target link. This is done based on the update indicated by the transmitted indication. The changing is performed only after receiving a confirmation of at least one of two options. According to the first option, the confirmation is from the wireless device, that the wireless device has received the indication. According to the second option, the confirmation is from a first network node operating in the wireless communications network, that the first network node has transmitted the indication to the wireless device.

According to a second aspect of embodiments herein, the object is achieved by a method performed by the first network node. The method is for handling the link switch of the wireless device from the source link to the target link. The first network node and the wireless device operate in the wireless communications network. Given the first configuration of the target link indicating resources for the wireless device to perform random access to the second network node operating in the wireless communications network, during the link switch from the source link to the target link, the first network node transmits, prior to the link switch, the indication from the second network node to the wireless device. The indication indicates the update to the first configuration. The first network node also transmits, to the second network node and prior to the link switch, the confirmation of at least one of two options. According to the first option, the confirmation is from the wireless device, that the wireless device has received the indication. According to the second option, the confirmation is from the first network node, that the first network node has transmitted the indication to the wireless device. The confirmation is transmitted as another indication.

According to a third aspect of embodiments herein, the object is achieved by a method performed by the wireless device. The method is for handling the link switch of the wireless device from the source link to the target link. The wireless device operates in the wireless communications network. Given the first configuration of the target link indicating the resources for the wireless device to perform random access to the network node, during the link switch from the source link to the target link, the network node operating in the wireless communications network, the wireless device receives, prior to the link switch, the indication from the second network node. The indication indicates the update to the first configuration. The wireless device also executes the link switch, based on the update indicated by the received indication. The executing is performed only after transmitting a confirmation that the wireless device has received the indication.

According to a fourth aspect of embodiments herein, the object is achieved by the network node. The network node may be considered to be for handling the link switch of the wireless device from the source link to the target link. The network node and the wireless device are configured to operate in the wireless communications network. The network node is further configured to, given the first configuration of the target link indicating the resources for the wireless device to perform random access to the network node, during the link switch from the source link to the target link, transmit, prior to the link switch, the indication to the wireless device. The indication is further configured to indicate the update to the first configuration. The network node is also configured to change the first configuration of the target link. This is configured to be performed, based on the update configured to be indicated by the transmitted indication. To change is configured to be performed only after receiving the confirmation of at least one of two options. According to the first option, the confirmation is from the wireless device, that the wireless device has received the indication. According to the second option, the confirmation is from the first network node configured to operate in the wireless communications network, that the first network node has transmitted the indication to the wireless device.

According to a fifth aspect of embodiments herein, the object is achieved by the first network node. The first network node may be considered to be for handling the link switch of the wireless device from the source link to the target link. The first network node and the wireless device are configured to operate in the wireless communications network. The first network node is further configured to, given the first configuration of the target link indicating the resources for the wireless device to perform random access to the second network node, configured to operate in the wireless communications network, during the link switch from the source link to the target link, transmit, prior to the link switch, the indication from the second network node to the wireless device. The indication is further configured to indicate the update to the first configuration. The first network node is also configured to transmit, to the second network node and prior to the link switch, the confirmation of at least one of the two options. According to the first option, the confirmation is from the wireless device, that the wireless device has received the indication. According to the second option, the confirmation is from the first network node, that the first network node has transmitted the indication to the wireless device. The confirmation is configured to be transmitted as the another indication.

According to a sixth aspect of embodiments herein, the object is achieved by the wireless device. The wireless device may be considered to be for handling the link switch of the wireless device from the source link to the target link. The wireless device is configured to operate in the wireless communications network. The wireless device is further configured to, given the first configuration of the target link indicating the resources for the wireless device to perform random access to the network node during the link switch from the source link to the target link, the network node being configured to operate in the wireless communications network, receive, prior to the link switch, the indication from the network node. The indication is configured to indicate the update to the first configuration. The wireless device is also configured to transmit, to execute the link switch. This is configured to be performed based on the update configured to be indicated by the received indication. To execute is configured to be performed only after transmitting a confirmation that the wireless device has received the indication.

By the network node transmitting the indication of the updated to the first configuration, and then changing the first configuration based on the update, only after having received the confirmation that either the wireless device has received the indication or that the first network node has transmitted the indication to the wireless device, the second network node is enabled to modify the first configuration, e.g., an RRC configuration, while ensuring that there is no mismatch between the configuration available to the wireless device and that available to the target cell that the switch will potentially be performed to. Such a mismatch would lead to a handover failure. The same applies to the actions performed by the wireless device, which only executes the link switch, only after transmitting the confirmation that the wireless device has received the indication. The first network node facilitates the exchange of communications between the network node, which may be referred to herein as a second network node, and the wireless device. Embodiments herein may therefore be understood to enable reconfiguration of a conditional handover command while at the same time increasing the reliability and HO performance.

BRIEF DESCRIPTION OF THE DRAWINGS

Examples of embodiments herein are described in more detail with reference to the accompanying drawings, and according to the following description.

FIG. 12 is a flowchart depicting embodiments of a method in a communications system including a host computer, a base station and a user equipment, according to embodiments herein.

FIG. 13 is a flowchart depicting embodiments of a method in a communications system including a host computer, a base station and a user equipment, according to embodiments herein.

FIG. 14 is a flowchart depicting embodiments of a method in a communications system including a host computer, a base station and a user equipment, according to embodiments herein.

FIG. 15 is a flowchart depicting embodiments of a method in a communications system including a host computer, a base station and a user equipment, according to embodiments herein.

DETAILED DESCRIPTION

Figure 1:
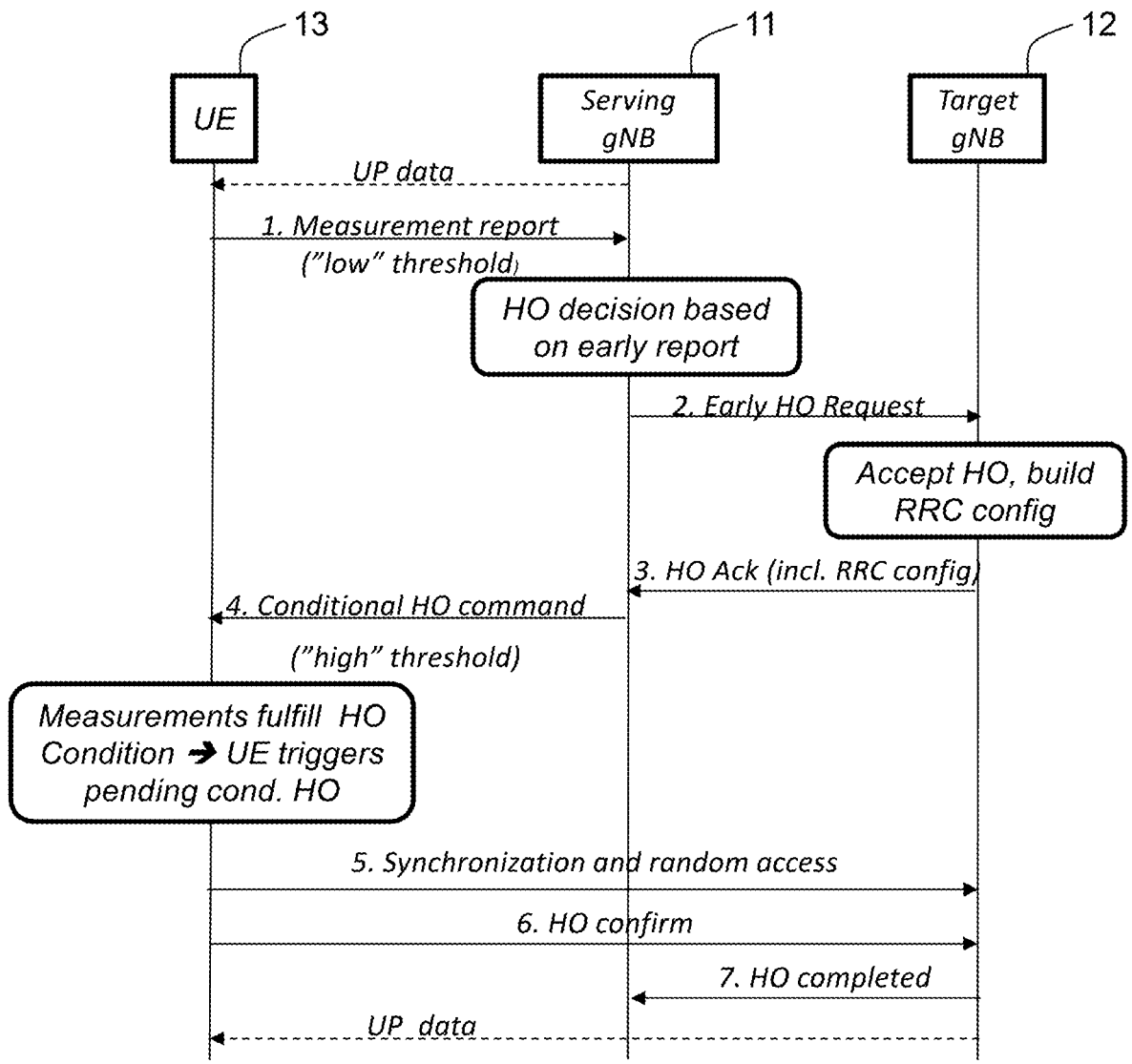
FIG. 1 is a schematic diagram illustrating an example of a conditional handover execution, according to existing methods.

As part of the development of embodiments herein, one or more challenges with the existing technology will first be identified and discussed.

As discussed earlier, WO 2018/132051 includes the possibility of sending a new, updated conditional HO command for a target cell for which a previous conditional configuration is available to the UE. This change of configuration may be originated from the target cell(s), which upon sending the updated configuration to the serving cell, may update its own resource information. On the other hand, the UE may try to perform handover before receiving the update from the source cell. Hence, the UE may try to access the outdated resources and hence this will lead to a handover failure.

Certain aspects of the present disclosure and their embodiments may provide solutions to this challenge or other challenges. There are, proposed herein, various embodiments which address one or more of the issues disclosed herein. As a brief overview, embodiments herein may be understood to relate to methods wherein if a potential target cell(s) of a conditional handover has already configured a UE with resources, the potential target cell(s) may update them only upon receiving confirmation, e.g., from the source cell, that the UE has received the updated configuration.

Expressed differently, embodiments herein may be understood to relate to methods that allow a target cell(s) to modify an RRC configuration, ensuring no mismatch between a configuration available to the UE and the target cell(s) that the handover will potentially be performed to. Embodiments herein may therefore be understood to be related to reconfiguration of a conditional handover command. Embodiments herein may accordingly be understood to increase the reliability and HO performance. In general, embodiments herein may therefore be understood to be related to conditional handover, handover enhancements, NR and/or LTE.

Some of the embodiments contemplated will now be described more fully hereinafter with reference to the accompanying drawings, in which examples are shown. In this section, the embodiments herein will be illustrated in more detail by a number of exemplary embodiments. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art. It should be noted that the exemplary embodiments herein are not mutually exclusive. Components from one embodiment may be tacitly assumed to be present in another embodiment and it will be obvious to a person skilled in the art how these components may be used in the other exemplary embodiments.

Note that although terminology from LTE/5G has been used in this disclosure to exemplify the embodiments herein, this should not be seen as limiting the scope of the embodiments herein to only the aforementioned system. Other wireless systems with similar features, may also benefit from exploiting the ideas covered within this disclosure.

Figure 2:
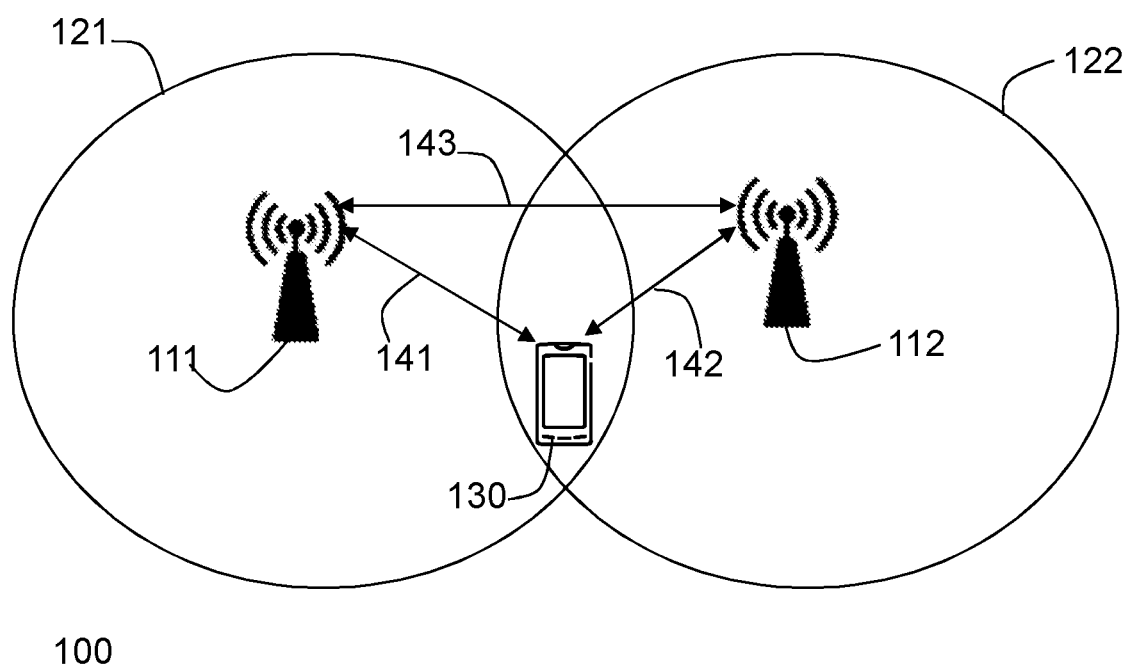
FIG. 2 is a schematic diagram illustrating a wireless communications network, according to embodiments herein.

FIG. 2 depicts a non-limiting example of a wireless communications network 100, sometimes also referred to as a wireless communications system, cellular radio system, or cellular network, in which embodiments herein may be implemented. The wireless communications network 100 may typically be a 5G system, 5G network, NR-U or Next Gen System or network, LAA, or MulteFire. The wireless communications network 100 may alternatively be a younger system than a 5G system. The wireless communications network 100 may support other technologies such as, for example, Long-Term Evolution (LTE), LTE-Advanced/LTE-Advanced Pro, e.g. LTE Frequency Division Duplex (FDD), LTE Time Division Duplex (TDD), LTE Half-Duplex Frequency Division Duplex (HD-FDD), LTE operating in an unlicensed band, and/or Narrow Band Internet of Things (NB-IoT). Thus, although terminology from 5G/NR and LTE may be used in this disclosure to exemplify embodiments herein, this should not be seen as limiting the scope of the embodiments herein to only the aforementioned systems.

The wireless communications network 100 comprises a plurality of network nodes, whereof a first network node 111 and a second network node 112, also referred to herein as a network node 112, are depicted in the non-limiting example of FIG. 2. Any of the first network node 111, and the second network node 112 may be a radio network node, such as a radio base station, or any other network node with similar features capable of serving a user equipment, such as a wireless device or a machine type communication device, in the wireless communications network 100. In some embodiments, the first network node 111 is an eNB and the second network node 112 is a gNB. In other embodiments, the first network node 111 is a first gNB, and the second network node 112 is a second gNB. This particular example is depicted in the non-limiting example of FIG. 2. In yet other embodiments, the first network node 111 may be a MeNB and the second network node 112 may be a gNB. In some examples, any of the first network node 111, and the second network node 112 may be co-localized, or be part of the same network node. In embodiments herein, the first network node 111 may be referred to as a source node or source network node, whereas the second network node 112 may be referred to as a target node or target network node.

The wireless communications network 100 covers a geographical area which may be divided into cell areas, wherein each cell area may be served by a network node, although, one network node may serve one or several cells. In the non-limiting example of FIG. 2, the wireless communications network 100 comprises a first cell 121 and a second cell 122. In FIG. 2, the first network node 111 serves the first cell 121, and the second network node 112 serves the second cell 122. Any of the first network node 111, and the second network node 112 may be of different classes, such as, e.g., macro base station (BS), home BS or pico BS, based on transmission power and thereby also cell size. Any of the first network node 111 and the second network node 112 may be directly connected to one or more core networks, which are not depicted in FIG. 2 to simplify the Figure. In some examples, any of the first network node 111, and the second network node 112 may be a distributed node, such as a virtual node in the cloud, and it may perform its functions entirely on the cloud, or partially, in collaboration with a radio network node. In embodiments herein, the first cell 121 may be referred to as a source cell, whereas the second cell 122 may be referred to as a target cell.

A plurality of wireless devices are located in the wireless communication network 100, whereof a wireless device 130, which may also be referred to simply as a device, is depicted in the non-limiting example of FIG. 2. The wireless device 130, e.g., a 5G UE, may be a wireless communication device which may also be known as e.g., a UE, a mobile terminal, wireless terminal and/or mobile station, a mobile telephone, cellular telephone, or laptop with wireless capability, just to mention some further examples. The wireless device 130 may be, for example, portable, pocket-storable, hand-held, computer-comprised, or a vehicle-mounted mobile device, enabled to communicate voice and/or data, via the RAN, with another entity, such as a server, a laptop, a Personal Digital Assistant (PDA), or a tablet, Machine-to-Machine (M2M) device, device equipped with a wireless interface, such as a printer or a file storage device, modem, or any other radio network unit capable of communicating over a radio link in a communications system. The wireless device 130 comprised in the wireless communications network 100 is enabled to communicate wirelessly in the wireless communications network 100. The communication may be performed e.g., via a RAN, and possibly the one or more core networks, which may be comprised within the wireless communications network 100.

The first network node 111 may be configured to communicate in the wireless communications network 100 with the wireless device 130 over a first communication link 141, e.g., a radio link. The second network node 112 may be configured to communicate in the wireless communications network 100 with the wireless device 130 over a second communication link 142, e.g., a radio link. The first network node 111 may be configured to communicate in the wireless communications network 100 with the second network node 112 over a third communication link 143, e.g., a radio link or a wired link, although communication over more links may be possible.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

In general, the usage of "first", "second", "third", "fourth", and/or "fifth" herein may be understood to be an arbitrary way to denote different elements or entities, and may be understood to not confer a cumulative or chronological character to the nouns they modify, unless otherwise noted, based on context.

Several embodiments are comprised herein. It should be noted that the examples herein are not mutually exclusive. Components from one embodiment may be tacitly assumed to be present in another embodiment and it will be obvious to a person skilled in the art how those components may be used in the other exemplary embodiments.

More specifically, the following are embodiments related to a first network node, such as the first network node 111, e.g., a first gNB, embodiments related to a second network node, such as the second network node 112, e.g., a second, and embodiments related to a wireless device, such as the wireless device 130, e.g., a 5G UE.

Figure 3:
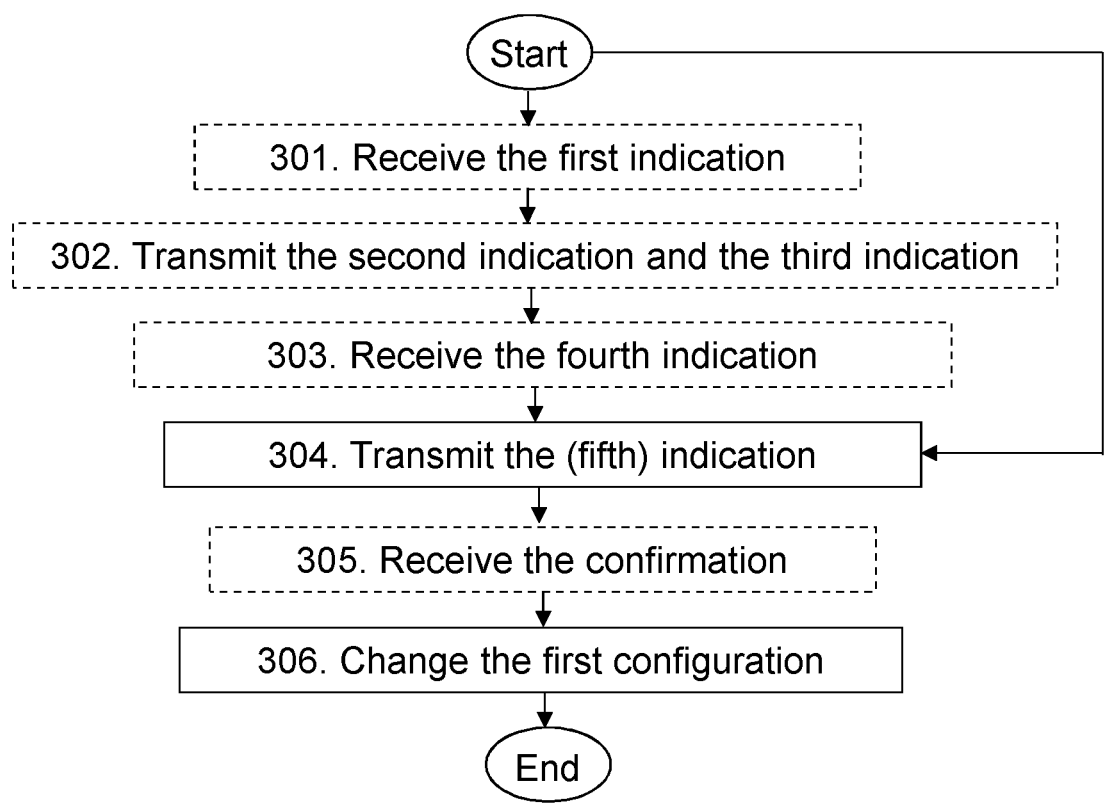
FIG. 3 is a flowchart depicting a method in a second network node, according to embodiments herein.

Embodiments of a method, performed by the network node 112 will now be described with reference to the flowchart depicted in FIG. 3. As stated earlier, the network node 112 may be referred to as a second network node 112. The method may be understood to be for handling a link switch of the wireless device 130 from a source link to a target link. The wireless device 130 operates in the wireless communications network 100.

Several embodiments are comprised herein. In some embodiments all the actions may be performed. In some embodiments, one or more actions may be performed. One or more embodiments may be combined, where applicable. All possible combinations are not described to simplify the description. In FIG. 3, optional actions are indicated with dashed lines. Some actions may be performed in a different order than that shown in FIG. 3. It should be noted that the examples herein are not mutually exclusive. Components from one embodiment may be tacitly assumed to be present in another embodiment and it will be obvious to a person skilled in the art how those components may be used in the other exemplary embodiments.

As used herein, a link switch, which may also be referred to simply as a switch, may be understood as a switch or change from e.g., a source link, such as the first communication link 141, to a target link, such as the second communication link 142. The link switch may be, e.g., a handover.

Action 301

The method described herein may take place in the following context. The wireless device 130 may be a UE enabled with capability to perform conditional handover. In the course of operations in the wireless communications network 100, the wireless device 130 may have performed measurements on the source cell 111, and, e.g., if the quality of the first communication link 141 has fallen below a certain value, the wireless device 130 may have triggered a measurement report on a lower threshold value than traditional handover, or a non-conditional handover. The first network node 111, managing the source cell 121, may have received the report, and, in an effort to secure continued service to the wireless device 130, may have sent an early handover request to the target cell(s), which may comprise the target cell 122, for example, via the second network node 112 managing the target cell 122.

In a non-limiting example of embodiments herein, the source cell 121, via the first network node 111, may indicate to the target cell 122, via the second network node 112, in the HO request message, information about the current radio qualities that may have been reported by the wireless device 130, and what 'condition' it may be planning to configure the wireless device 130 with for the execution of the handover command.

In this Action 301, the second network node 112 may receive, from the first network node 111, a first indication. The first indication may indicate one or more conditions according to which the wireless device 130 is to execute the link switch from the source link to the target link.

The first network node 111 may be understood to be operating in the wireless communications network 100.

The receiving in this Action 301 may be performed via, e.g., the third communication link 143.

The one or more conditions may be, for example, an Ax (A1-A6) event threshold that may be expected to occur in future. The event evaluation criteria may be based on RSRP, RSRQ, SINR or some other radio measurements.

In some examples, the first indication may be, or may be comprised in, a HO request or Early HO request message. In some examples wherein the first indication may be comprised in a HO request or Early HO request message, the first indication may be, e.g., an optional Information Element (IE) in the HandoverRequest-IEs that may be contained inside the HandoverRequest message, that is, the first indication may be, for example, a new optional IE(s) in an existing HANDOVER REQUEST message.

By receiving the first indication in this Action 301, the second network node 112 may be understood to be enabled to prepare any resources that may need to be sent to the wireless device 130 for performing handover. Examples of such resources may comprise an identifier (ID) for the second network node 112, security algorithms, a new C-RNTI, RACH resources, system information of the second network node 112 etc.

Action 302

In this Action 302, the second network node 112 may transmit a second indication. The second indication may indicate a timer, e.g., a first timer. The second network node 112 may also transmit a third indication. The third indication may indicate one or more Random Access Channel (RACH) configurations. Each of the one or more RACH configurations may be valid during different values of the first timer.

Transmitting may be understood as sending. The transmitting in this Action 302 may be to the first network node 111, and may be implemented, e.g., via the third communication link 143. The second indication and the third indication may be understood to be intended for the wireless device 130. The first network node 111 may then forward the second indication and the third indication to the wireless device 130 in e.g., RRC (Re-)configuration messages.

The one or more configurations may comprise different density of RACH resources being used over time. RACH resources may be understood to comprise all information that may be necessary for the wireless device 130 to perform random access once it performs handover to the second network node 112. The details of RACH resources may be understood to depend on the technology, e.g., LTE or NR. These may be found in RACH-ConfigCommon or RACH-ConfigDedicated IEs in the 3GPP TS 36.331 v15.2.0 or 3GPP TS 38.331 v15.2.0. The first timer may be understood as a time period during which the conditional handover configuration may be assumed to be valid. In some examples, the first timer may have been self-assigned by the second network node 112. In other examples, such as those according to Action 303, the first timer may be received from the first network node 111, and may then be edited by the second network node 112. When the first timer associated to the condition handover command may have a large value, then the amount of contention free random access (CFRA) resources used may be higher (CFRA-set1), whereas when the timer associated to the condition handover command may have a lower value, then the amount of CFRA resources used may be lower (CFRA-set2). This may be understood to enable to reduce the wastage of resources.

As an example, depending on the information received from the first network node 111 in Action 301, the target cell 122 may include, via the second network node 112, a timer, such as the first timer, and a time varying RACH configuration directly in the Early HO request acknowledgement message.

TABLE 1

| Conditional HO related Timer value at the UE (this timer may be sent by the target cell as part of HO command) | Conditional HO related CFRA resources to be used by the UE (this timer may be sent by the target cell as part of HO command) |
|---|---|
| Timer value < X | RACHConfig-Dedicated-set1 |
| Timer value >= X | RACHConfig-Dedicated-set2 |

Particularly, in some embodiments, the second indication may be comprised in an information element. In some particular embodiments, the information element may be a MobilityControlInfo information element.

As an example of such embodiments, an ASN.1 specification format related to such a configuration which may be comprised in the second indication and/or third indication is given below. The IE mobilityControlInfo may be sent to the wireless device 130 via RRCReconfiguration, which may be sent in the handoverCommand by the first network node 111, see Action 605 in FIG. 6. Only relevant fields are shown, others are omitted. In an example of how to use such a time varying RACH configuration, the wireless device 130 may be configured with the first timer, here indicated as a conditionHOTimer, value of, e.g., 500 ms and the wireless device 130 may be provided with three different CFRA resource lists. The first CFRA resource list, or set, may be to be used if the timer value running at the wireless device 130 is above 400 ms, the second CFRA resource set may be to be used when the timer value is between 200 ms and 400 ms and the last CFRA resource set may be to be used when the timer value is between 200 ms and 100 ms. If the timer is below 100 ms, then the wireless device 130 may need to use CBRA resources to access the target cell 122.

The IE MobilityControlInfo may include parameters relevant for network controlled mobility to and/or within NR.

MobilityControlInfo Information Element

```
-- ASN1START
MobilityControlInfo ::=        SEQUENCE {
    targetPhysCellId                PhysCellId,
    radioResourceConfigCommon       RadioResourceConfigCommon,
    conditionalHOTimer              ENUMERATED {
                                        ms50, ms100, ms150, ms200, ms500, ms1000}
    rach-ConfigDedicatedList        RACH-ConfigDedicatedList         OPTIONAL,   -- Need OP
}
RACH-Config DedicatedList ::=   SEQUENCE (SIZE (1..maxCFRAforCHO)) OF RACH-ConfigDedicatedCHO
RACH-ConfigDedicatedCHO::=  SEQUENCE {
    timerValue                      INTEGER (1..1000),
    rach-ConfigDedicatedList        RACH-ConfigDedicated
}
-- ASN1STOP
```

A non-limiting example is depicted in Table 1, wherein the wireless device 130 is a UE. More than one configuration may be understood to enable the second network node 112 to have more efficient resource utilization.

The second indication and the third indication may be, for example, comprised in an Early HO request acknowledgement message.

By transmitting the second indication and the third indication in this Action 302, the second network node 112 enables the wireless device 130 to perform handover to the second network node 112 once the conditions may have been fulfilled.

In embodiments wherein this Action 302 may be performed, the switch, as eventually performed by the wireless device 130, may be based on one or more of the first indication, the second indication and the third indication.

Action 303

On a separate example, another timer, a second timer or validity timer $t_1$ may be allocated by the source cell 121 via the first network node 111. Potential target cell(s) such as the target cell 122 may be updated regarding the second timer in the Early HO request. The rationale behind such update may be understood to be that the source cell 121 may be better informed about the wireless device 130 condition and, thus, may be in a better position to judge how long the wireless device 130 may need to hold the resources for handover. The target cell(s), such as the target cell 122, may allocate necessary resources according to the second timer, if possible. However, this embodiment does not preclude the target cell(s) to modify the allocation afterwards.

According to the foregoing, in this Action 303, the second network node 112 may receive, from the first network node 111, a fourth indication. The fourth indication may indicate a timer, e.g., a second timer. Each of one or more RACH configurations allocated by the second network node 112, may be valid during different values of the second timer. In embodiments wherein this Action 303 may be performed, the link switch may be based on the fourth indication.

The second timer, or validity timer, $t_1$, may be understood to be equivalent to the first timer, but it may be received from the network node 111.

In such embodiments, any of: the third indication and the fourth indication may be comprised in an information element. In some embodiments, any of: the second indication, the third indication and the fourth indication may be comprised in an information element. In some particular embodiments, the information element may be a MobilityControlInfo information element.

On yet another new example, the allocated timer(s), that is, any of the first timer and the second timer, may be based on SubFrame Number (SFN) periods. The timers may also be a mixture of time in milliseconds and an SFN counter. In this case, the proposed timers associated with conditional handover, that is, the validity timer or second timer, irrespective of being allocated by the source cell 121 and/or the target cell 122, and the timer condition mentioned in the previous example, separate timer allocated by the target cell 122 for separate resource allocation by the target cell 122, may be counted using a SFN counter. The range of the values of the timer, that is, any, or both, of the first timer and the second timer, may be standardized. In such a configuration, the above IE may be modified as shown below:

MobilityControlInfo Information Element

According to the foregoing, in some embodiments, the second timer may be based on one or more Subframe Number (SFN) periods.

In some examples, any of the first timer and the second timer may be based on one or more Subframe Number (SFN) periods.

Action 304

The target cell(s), e.g., the target cell 122, via the second network node 112, may have allocated any necessary random-access resources, e.g., in a first configuration out of the one or more RACH configurations, and informed the same to the source cell 111, via the first network node 111, in accordance with Action 302. This may have been performed via an early HO request acknowledgement, which in turn may have forwarded it, or them, to the wireless device 130. The first configuration may indicate resources for the wireless device 130 to perform random access to the second network node 112 during the link switch from the source link to the target link.

Later, the previously configured target cell(s) may decide an update of the allocated random-access resources that may need to be used by the wireless device 130 for conditional HO execution. This update may happen, for example, if the network load condition changes, such that the target cell(s) 122 are not prepared to the admit the wireless device 130 anymore, or for some optimization of the resources.

Given the first configuration of the target link indicating resources for the wireless device 130 to perform random access to the network node 112 during the link switch from the source link to the target link, the second network node 112 in this Action 304, transmits, prior to the link switch, an indication to the wireless device 130. The indication indicates an update to the first configuration. The indication in this Action 304 may be considered another indication that those described so far, e.g., a fifth indication.

In some embodiments, the indication, that is, the fifth indication, may be transmitted via the first network node 111, which may be understood to be operating in the wireless communications network 100.

The first indication may be comprised in an updated HO command.

The first configuration may be regarding e.g., a set of random-access resources, to perform for example a conditional handover.

In some examples, all of the one or more RACH configurations may be updated. In other examples some of the one or more RACH configurations may be updated, that is more configurations than the first configuration.

By transmitting the fifth indication in this Action 304, the second network node 112 enables to provide the wireless device 130 with an update and/or cancellation of the

```
-- ASN1START
MobilityControlInfo ::=        SEQUENCE {
targetPhysCellId                       PhysCellId,
    radioResourceConfigCommon                  RadioResourceConfigCommon,
    conditionalHOTimer                         BIT STRING (SIZE (FFS)),
    rach-ConfigDedicatedList           RACH-ConfigDedicatedList     OPTIONAL,  -- Need OP
}
RACH-ConfigDedicatedList ::=    SEQUENCE (SIZE (1..maxCFRAforCHO)) OF RACH-ConfigDedicatedCHO
RACH-ConfigDedicatedCHO::=  SEQUENCE {
    timerValue                         BIT STRING (SIZE (FFS)),
    rach-ConfigDedicatedList           RACH-ConfigDedicated
}
-- ASN1STOP
``` resources allocated before. New configurations for the second network node 112 may reflect recent network changes. Examples of these updates may be, not limiting to, an update for the validity timer, or a change in the RACH resources.

Action 305

In this Action 305, the second network node 112 may receive the confirmation that at least one of the following options has happened. According to a first option, the wireless device 130 has received the indication, that is, the fifth indication, wherein the confirmation may have been received from the wireless device 130, and wherein the confirmation may have been received as a sixth indication 606 via the first network node 111, e.g., via the first communication link 141 and the third communication link 143. According to a second option, the first network node 111 has transmitted the indication to the wireless device 130. The confirmation may then have been received from the first network node 111 e.g., via the third communication link 143. For example, the confirmation may be received from the first network node 111 comprised in an RRC configuration Acknowledgement. Similarly, the confirmation may have been received from the wireless device 130 in an RRC configuration Acknowledgement.

By receiving the confirmation in this Action 305, the second network node 112 may now be understood to be enabled to change the first configuration according to the next Action 306, so that no mismatch may be created between itself and the wireless device 130 when the link change may take place.

Action 306

In this Action 306, the second network node 112 changes the first configuration of the target link, based on the update indicated by the transmitted indication. The changing in this Action 306 is performed only after receiving the confirmation of at least one of: i) from the wireless device 130, that the wireless device 130 has received the indication, and ii) from the first network node 111 operating in the wireless communications network 100, that the first network node 111 has transmitted the indication to the wireless device 130.

In particular examples, the second network node 112 may change, in this Action 306, the first configuration of the target link, based on the update indicated by the transmitted indication, wherein the changing in this Action 306 is performed only after receiving the confirmation from the wireless device 130 that the wireless device 130 has received the indication.

Changing the configuration of the target link may comprise for example, release the previously allocated resources and allocating the updated resources for the wireless device 130.

By changing the first configuration of the target link, based on the update, only after having received the confirmation that either the wireless device 130 has received the indication or the first network node 111 has transmitted the indication to the wireless device 130, the second network node 112 is enabled to modify the first configuration, e.g., an RRC configuration, while ensuring that there is no mismatch between the configuration available to the wireless device 130 and that available to the target cell 122 that the switch will potentially be performed to. Embodiments herein may therefore be understood to enable reconfiguration of a conditional handover command while at the same time increasing the reliability and HO performance.

In some examples, one or more of the Actions just described may be performed after the second network node 112 may receive a request from the first network node 111 for performing a conditional handover, e.g., via an Early HO request.

In some examples, one or more of the Actions just described may be performed after the second network node 112 may transmit the first configuration of the target link.

Figure 4:
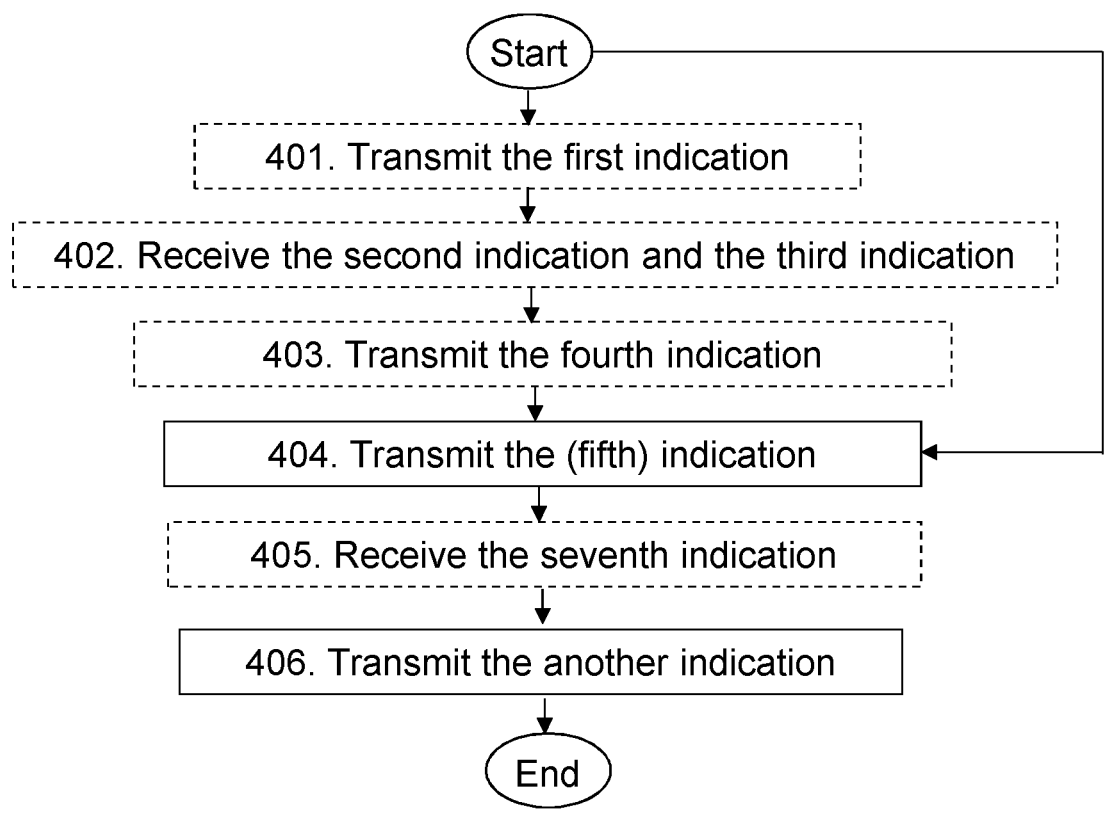
FIG. 4 is a flowchart depicting a method in a first network node, according to embodiments herein.

Embodiments of a method, performed by the first network node 111, will now be described with reference to the flowchart depicted in FIG. 4. The method may be understood to be for handling the link switch of the wireless device 130 from the source link, such as the first link 141, to the target link, such as the second link 142. The first network node 111 and the wireless device 130 operate in the wireless communications network 100.

Several embodiments are comprised herein. In some embodiments all the actions may be performed. In some embodiments, one or more actions may be performed. It should be noted that the examples herein are not mutually exclusive. One or more embodiments may be combined, where applicable. All possible combinations are not described to simplify the description. Components from one embodiment may be tacitly assumed to be present in another embodiment and it will be obvious to a person skilled in the art how those components may be used in the other exemplary embodiments. In FIG. 4, optional actions are indicated with dashed lines. Some actions may be performed in a different order than that shown in FIG. 4.

The detailed description of some of the following corresponds to the same references provided above, in relation to the actions described for the second network node 112, and will thus not be repeated here to simplify the description. For example, in some examples, the first indication may be, or may be comprised in, a HO request or Early HO request message.

Action 401

In this Action 401, the first network node 111 may transmit, to the second network node 112, the first indication. The first indication may indicate the one or more conditions according to which the wireless device 130 is to execute the link switch from the source link to the target link.

Transmitting may be understood as sending. The sending in this Action 401 may be performed via, e.g., the third communication link 143.

Action 402

In this Action 402, the first network node 111 may receive, from the second network node 112, the second indication. The second indication may indicate the first timer. The first network node 111 may also receive in this Action 401, from the second network node 112, the third indication. The third indication may indicate the one or more RACH configurations. Each of the one or more RACH configurations may be valid during different values of the first timer.

In some embodiments, the link switch of the wireless device 130 from the source link to the target link may be based on one or more of the first indication, the second indication and the third indication.

The second indication may be comprised in an information element.

The receiving in this Action 402 may be performed via, e.g., the third communication link 143.

Action 403

In this Action 403, the first network node 111 may transmit, to the second network node 112, the fourth indication. The fourth indication may indicate the second timer.

Each of one or more RACH configurations allocated by the second network node 112, may be valid during different values of the second timer.

In embodiments wherein this Action 403 may be performed, the link switch may be based on the fourth third indication.

In some examples, any of: the second indication, the third indication and the fourth indication may be comprised in an information element.

In some embodiments, any of: the third indication and the fourth indication may be comprised in an information element.

The information element may be a MobilityControlInfo information element.

Any of the first timer and the second timer may be based on one or more Subframe Number (SFN) periods.

In some embodiments, the second timer may be based on one or more SFN periods.

The transmitting in this Action 403 may be performed via, e.g., the third communication link 143.

Action 404

Given the first configuration of the target link indicating the resources for the wireless device 130 to perform random access to the second network node 112, operating in the wireless communications network 100, during the link switch from the source link to the target link, in this Action 404, the first network node 111 transmits, prior to the link switch, the indication, that is, the fifth indication, from the second network node 112 to the wireless device 130. The indication indicates the update to the first configuration.

The first configuration may be regarding e.g., the set of random-access resources, to perform for example the conditional handover.

The transmitting in this Action 404 may be performed via, e.g., the first communication link 141.

Action 405

In this Action 405, the first network node 111 may receive, from the wireless device 130, the confirmation that the wireless device 130 has received the indication as a seventh indication. The seventh indication may be, or may be comprised, for example, in an RRC Re-configuration Acknowledgement.

The receiving in this Action 405 may be implemented via, e.g., the first communication link 141.

Action 406

In this Action 406, the first network node 111 transmits, to the second network node 112 and prior to the link switch, the confirmation of at least one of: i) from the wireless device 130, that the wireless device 130 has received the indication, and ii) from the first network node 111, that the first network node 111 has transmitted the indication to the wireless device 130. The confirmation is transmitted as another indication. The another indication may be referred to in some embodiments as the sixth indication. The sixth indication may be, or may be comprised, for example, in an RRC Re-configuration Acknowledgement.

In some particular examples, the first network node 111, in this Action 406 may transmit, to the second network node 112 and prior to the link switch, the confirmation from the wireless device 130, that the wireless device 130 has received the indication; the confirmation may be transmitted as the another indication 607.

The transmitting in this Action 406 may be performed via, e.g., the third communication link 143.

In some examples, one or more of the Actions just described as performed by the first network node 111 may be performed after the first network node 111 may send the request to the second network node 112 for performing a conditional handover.

In some examples, one or more of the Actions just described may be performed after the first network node 111 may receive the first configuration of the target link; the first configuration may indicate resources for the wireless device 130 to perform random access to the second network node 112 during the link switch from the source link to the target link.

Figure 5:
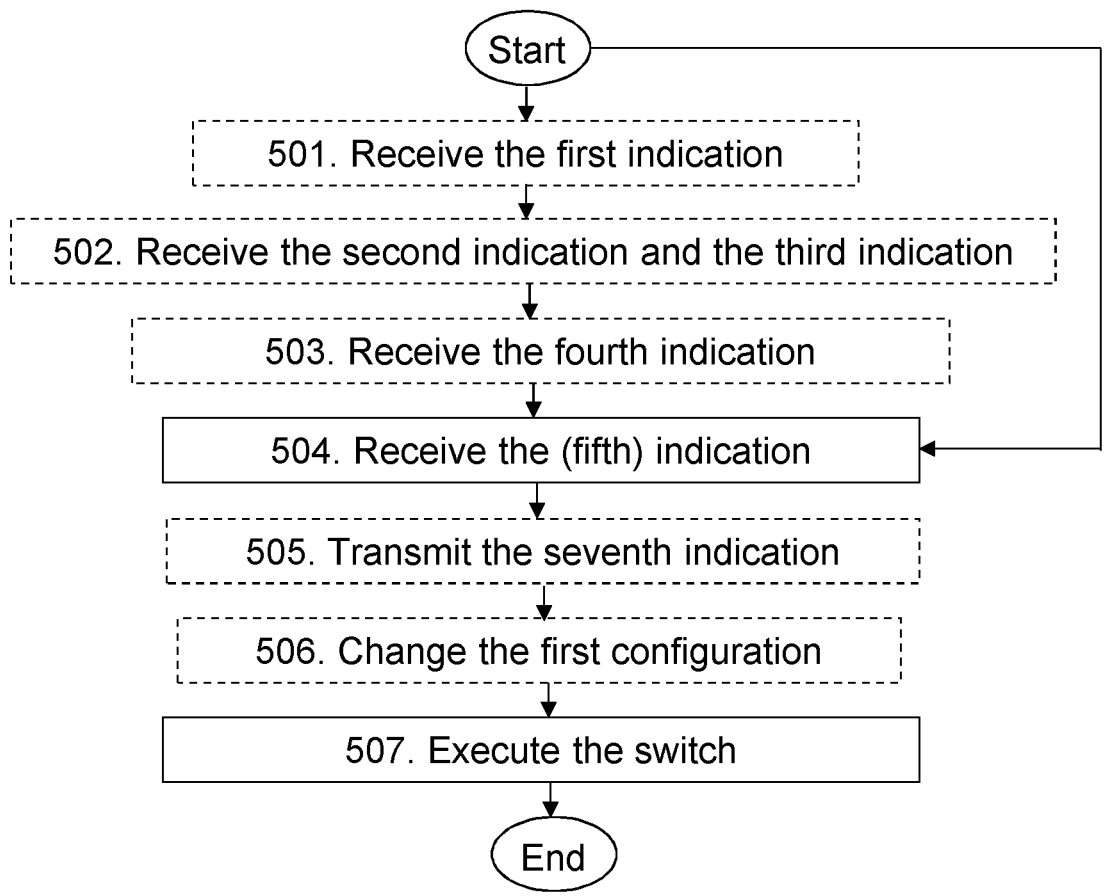
FIG. 5 is a flowchart depicting a method in a wireless device, according to embodiments herein.

Embodiments of a method, performed by the wireless device 130, will now be described with reference to the flowchart depicted in FIG. 5. The method may be understood to be for handling the link switch of the wireless device 130 from the source link, such as the first link 141, to the target link, such as the second link 142. The wireless device 130 operates in the wireless communications network 100.

Several embodiments are comprised herein. In some embodiments all the actions may be performed. In some embodiments, one or more actions may be performed. It should be noted that the examples herein are not mutually exclusive. One or more embodiments may be combined, where applicable. All possible combinations are not described to simplify the description. Components from one embodiment may be tacitly assumed to be present in another embodiment and it will be obvious to a person skilled in the art how those components may be used in the other exemplary embodiments. In FIG. 5, optional actions are indicated with dashed lines. Some actions may be performed in a different order than that shown in FIG. 5.

The detailed description of some of the following corresponds to the same references provided above, in relation to the actions described for the second network node 112, and will thus not be repeated here to simplify the description. For example, in some examples, the first indication may be, or may be comprised in, a HO request or Early HO request message.

Action 501

In this Action 501, the wireless device 130 may receive, from the first network node 111 operating in the wireless communications network 100, the first indication. The first indication may indicate the one or more conditions according to which the wireless device 130 is to execute the link switch from the source link to the target link.

The receiving in this Action 501 may be performed via, e.g., the first communication link 141.

The link switch may be based on one or more of the first indication, the second indication and the third indication.

Action 502

In this Action 502, the wireless device 130 may receive the second indication. The second indication may indicate the first timer. The wireless device 130 may also receive, in this Action 502, the third indication. The third indication may indicate the one or more RACH configurations. Each of the one or more RACH configurations may be valid during different values of the first timer.

In some embodiments, the link switch may be based on the one or more of the first indication, the second indication and the third indication.

The second indication may be comprised in an information element.

The receiving in this Action 502 may be performed from the first network node 111 via e.g., the first communication link 141.

Action 503

In this Action 503, the wireless device 130 may receive, from the first network node 111 operating in the wireless communications network 100, the fourth indication. The fourth indication may indicate the second timer. Each of one or more RACH configurations allocated by the second network node 112, may be valid during different values of the second timer.

In embodiments wherein this Action 503 may be performed, the link switch may be based on the fourth third indication.

In some examples, any of: the second indication, the third indication and the fourth indication may be comprised in an information element.

In some embodiments, any of: the third indication and the fourth indication may be comprised in an information element.

The information element may be a MobilityControlInfo information element.

Any of the first timer and the second timer may be based on one or more Subframe Number (SFN) periods.

In some embodiments, the second timer may be based on one or more SFN periods.

The receiving in this Action 503 may be performed via, e.g., the first communication link 141.

Action 504

Given the first configuration of the target link indicating the resources for the wireless device 130 to perform random access to the second network node 112 during the link switch from the source link to the target link, the second network node 112 operating in the wireless communications network 100, in this Action 504, the wireless device 130 receives, prior to the link switch, the indication, that is, the fifth indication, from the second network node 112. The indication indicates the update to the first configuration.

The first configuration may be regarding e.g., the set of random-access resources, to perform for example the conditional handover.

The receiving in this Action 502 may be performed directly from the second network node 112 via, e.g., the second communication link 142. In some embodiments, the indication may be received via the first network node 111 operating in the wireless communications network 100. This may be performed via, e.g., the first communication link 141.

Action 505

In this Action 505, the wireless device 130 may transmit, to the second network node 112, the confirmation that the wireless device 130 has received the indication. The confirmation may be transmitted as the seventh indication. The confirmation may be transmitted via the first network node 111. This may be performed via, e.g., the first communication link 141.

Transmitting may be understood as sending.

Action 506

In this Action 506, the wireless device 130 may change the first configuration of the target link, based on the update indicated by the received indication, that is, the fifth indication. The changing in this Action 506 may be performed only after transmitting the confirmation to the network node 112 that the wireless device 130 has received the indication.

The changing in this Action 506 may be understood as, e.g., updating.

Action 507

In this Action 507, the wireless device 130 executes the link switch. This is based on the update indicated by the received indication, that is, the fifth indication. The executing in this Action 507 is performed only after transmitting the confirmation that the wireless device 130 has received the indication, that is, the seventh indication. The seventh indication may be, or may be comprised, for example, in an RRC Re-configuration Acknowledgement.

Executing the link switch in this Action 506 may comprise, e.g., detaching from the first network node 111 and synchronizing with the second network node 112, the wireless device 130 may send an RRCReconfigurationComplete message to the second network node 112 to confirm that the link switch has been completed etc. . . . . .

In some examples, one or more of the Actions just described may be performed after the request from the first network node 111 for performing the conditional handover.

In some examples, one or more of the Actions just described may be performed after the second network node 112 may transmit the first configuration of the target link; the first configuration may indicate resources for the wireless device 130 to perform random access to the second network node 112 during the link switch from the source link to the target link.

Some embodiments herein will now be further described with some non-limiting examples.

In the following description, any reference to a/the UE may be understood to equally refer the wireless device 130; any reference to a/the source may be understood to equally refer the first network node 111; and any reference to a/the target may be understood to equally refer the second network node 112; any reference to a/the source cell may be understood to equally refer the first cell 121; any reference to a/the target cell may be understood to equally refer the second cell 122.

Figure 6:
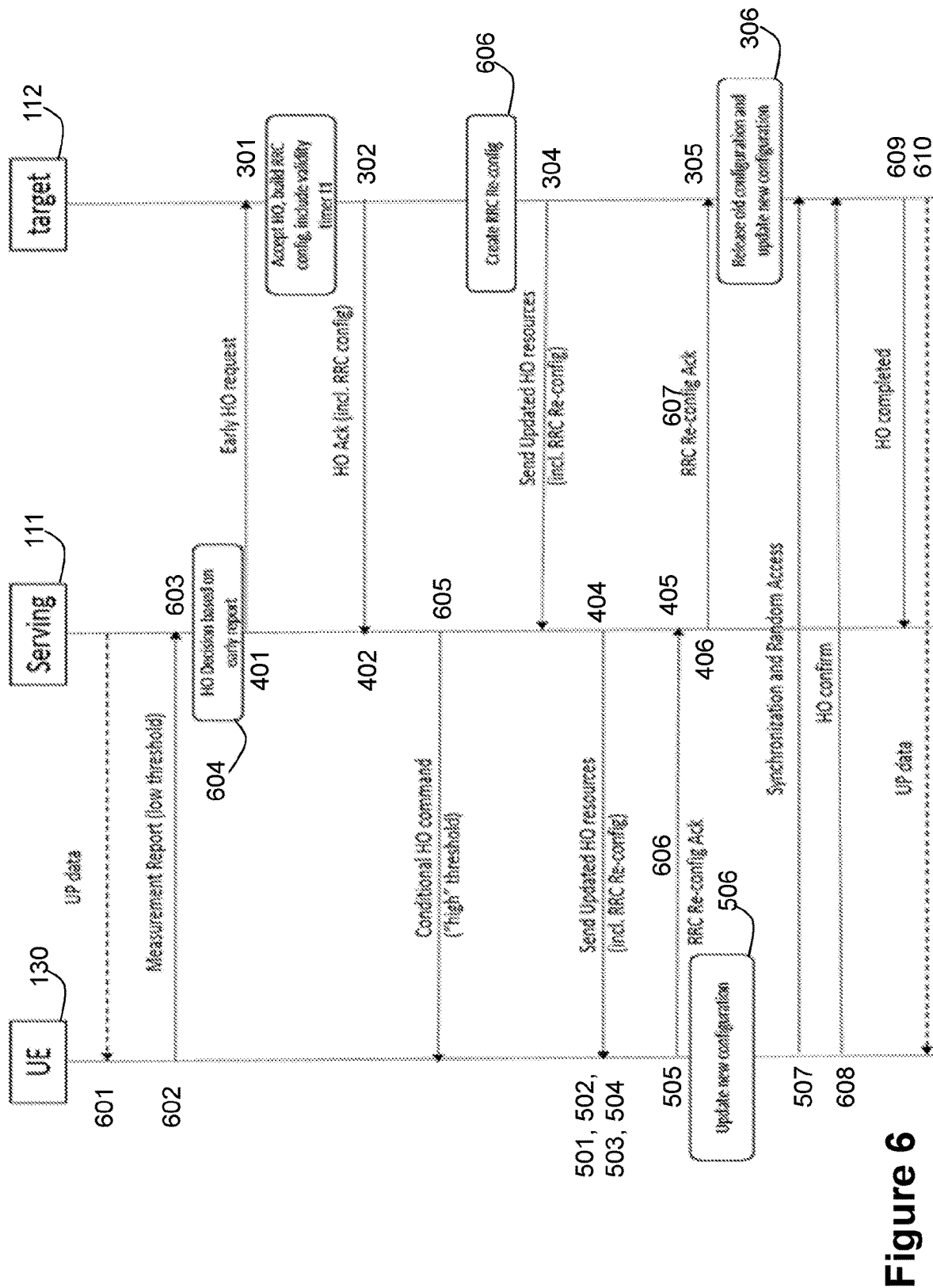
FIG. 6 is a schematic diagram illustrating an example of a method of updating conditional handover resources, according to embodiments herein.

A non-limiting example of the signal flow according to embodiments herein may be found in the signalling diagram of FIG. 6. In this example, the wireless device 130 is a UE enabled with the capability to perform conditional handover. At 601, the wireless device 130 performs measurements on the first link 141 with the first network node 111, that is, the serving network node. Once for example, the strength or the quality of the measured signal goes below a threshold, the wireless device 130 at 602 may trigger a measurement report on a lower threshold value. The source cell 121, via the first network node 111 may receive the report at 603 and may take an HO decision based on the early report at 604. The first network node 111 may then, in accordance with Action 401, send an early handover request to the target cell(s), one of which is the target cell 122. The target cell(s), e.g., the target cell 122, via the second network node 112, receives the early handover request, in accordance with Action 601 and, may allocate any necessary random-access resources, e.g., in the first configuration, and inform the same, in accordance with Action 602, to the source cell 121, that is, via the first network node 111, via an early HO request acknowledgement. The first network node 111 may then receive early HO request acknowledgement in accordance with Action 402, and may in turn forward it (them) to the UE at 605. Later, the previously configured target cell(s), e.g., the target cell 122, may, at 606, decide an update of the allocated random-access resources that may need to be used by the UE for condition HO execution. In a first non-limiting example, after decision of the updated resources, the target cell(s) e.g., the target cell 122, may:

1. Forward, according to this Action 304, the updated HO command configuration to the source cell 121, via the first network node 111;
2. The source cell 121, via the first network node 111, may then forward, in accordance with Action 404, the configuration to the wireless device 130, e.g., a UE, via RRCReconfiguration.

a. The wireless device 130 may receive the update, in accordance with Action 504, and send the seventh indication 606 as an ACK to the source cell 121, via the first network node 111, in accordance with Action 505, which is received by the first network node 111 in accordance with Action 405;

3. The source cell 121, via the first network node 111, may confirm to the target cell(s), e.g., the target cell 122, regarding the update being successful at 406, by transmitting the sixth indication 607 as an RRC-configuration acknowledgement, which is received by the second network node 112 in accordance with Action 305;

4. The target cell(s) 122, via the second network node 112, may then release the previously allocated resources and allocate the updated resources for the wireless device 130, in accordance with Action 306.

In accordance with Action 507, the wireless device 130 executes the link switch by performing synchronization and random access with the target cell 122. At 608, the wireless device 130 then sends a HO confirmation to the second network node 112, which then, at 609, notifies the first network node 111 that the HO has been completed. At 610, the second network node 112, via the target cell 122, transmits data to the wireless device 130.

In another non-limiting example, after a decision regarding the updated resources, the target cell(s), e.g., the target cell 122, via the second network node 112, may:

1. Forward, in accordance with Action 604, the updated handover command configuration to the source cell 121, via the first network node 111;
2. The source cell 121, via the first network node 111 may forward the configuration to the UE, in accordance with Action 404;
3. The source cell 121, via the first network node 111, may send, in accordance with Action 406, a confirmation to the target cell(s), e.g., the target cell 122, via the second network node 112; and
4. The target cell(s) 122, via the second network node 112 may then release the previously allocated resources and allocate the updated resources for the UE, in accordance with Action 306.

Certain embodiments disclosed herein may provide one or more of the following technical advantage(s), which may be summarized as follows. Embodiments herein enable the network to have more control on the handover performed by the wireless device 130, e.g., a UE. It is expected that a network deploying such a scheme may provide more robustness to the handover performance.

Figure 7:
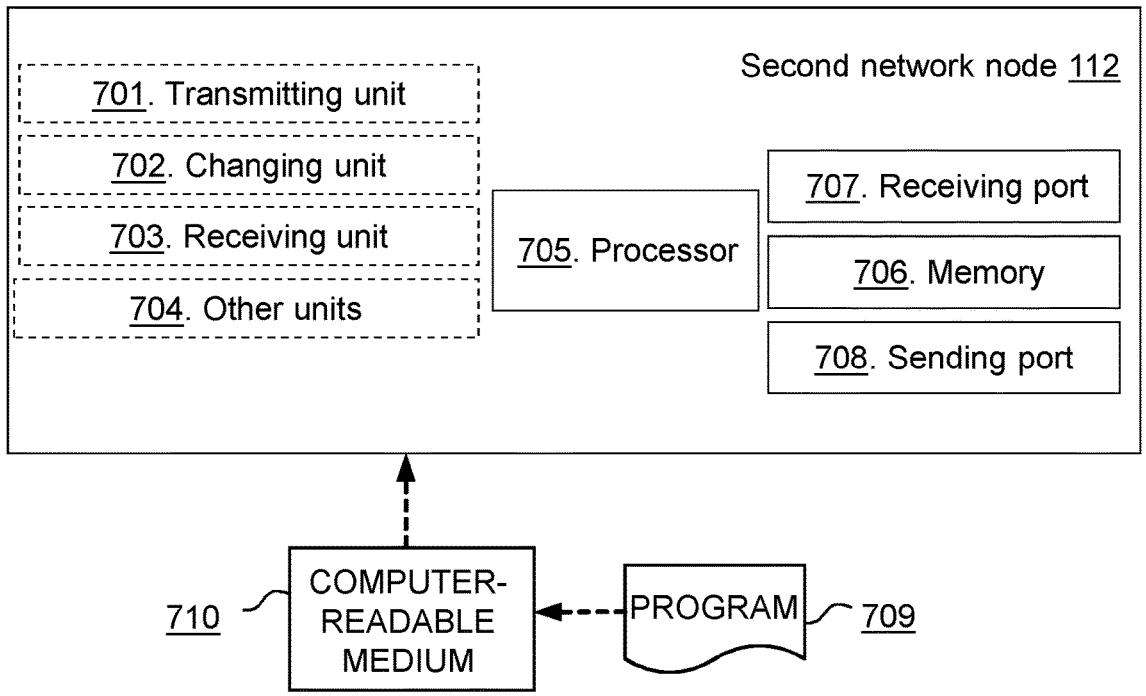
FIG. 7 is a schematic block diagram illustrating two non-limiting examples, a) and b), of a second network node, according to embodiments herein.
Figure 7:
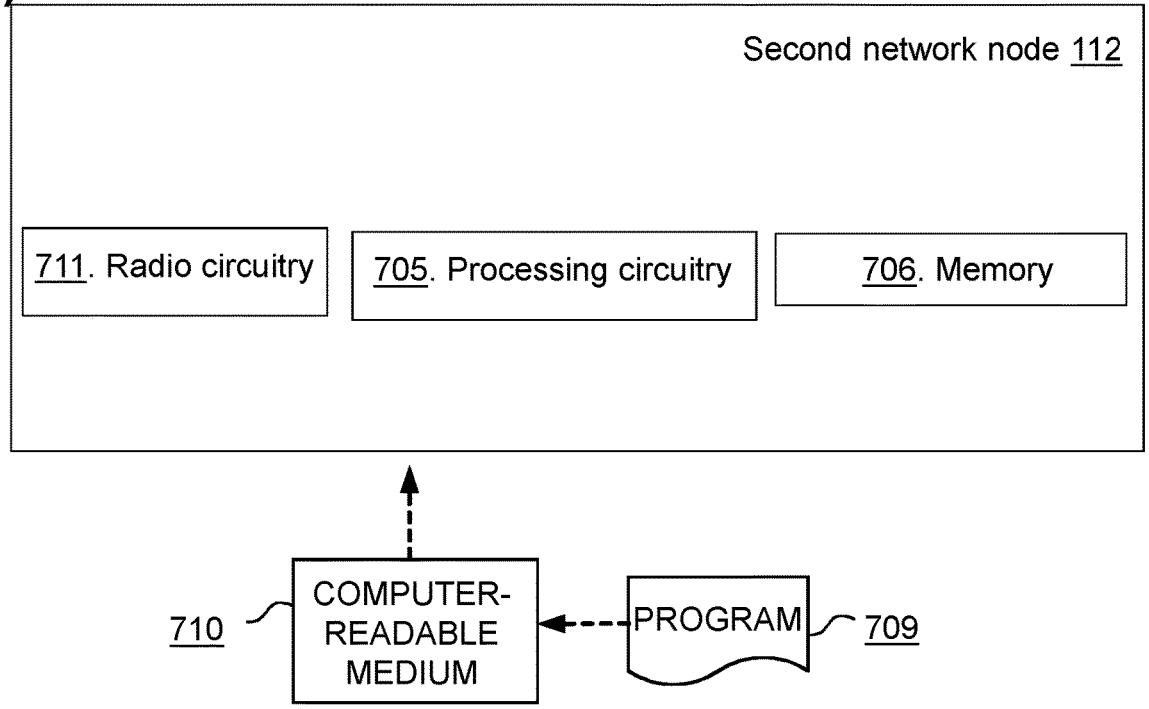

FIG. 7 depicts two different examples in panels a) and b), respectively, of the arrangement that the network node, also referred to herein as the second network node 112, may comprise. In some embodiments, the second network node 112 may comprise the following arrangement depicted in FIG. 7a. The second network node 112 may be understood to be for handling the link switch of the wireless device 130 from the source link to the target link. The second network node 112 and the wireless device 130 are configured to operate in the wireless communications network 100.

Several embodiments are comprised herein. It should be noted that the examples herein are not mutually exclusive. One or more embodiments may be combined, where applicable. All possible combinations are not described to simplify the description. Components from one embodiment may be tacitly assumed to be present in another embodiment and it will be obvious to a person skilled in the art how those components may be used in the other exemplary embodiments. In FIG. 7, optional units are indicated with dashed boxes.

The detailed description of some of the following corresponds to the same references provided above, in relation to the actions described for the second network node 112, and will thus not be repeated here. For example, in some examples, the first indication may be, or may be comprised in, a HO request or Early HO request message The second network node 112 is configured to perform the transmitting of Action 304, e.g. by means of a transmitting unit 701 within the second network node 112, configured to, given the first configuration of the target link indicating resources for the wireless device 130 to perform random access to the network node 112, that is, the second network node 112, during the link switch from the source link to the target link, transmit, prior to the link switch, the indication to the wireless device 130. The indication is further configured to indicate the update to the first configuration. The transmitting unit 701 may be a processor 705 of the second network node 112, or an application running on such processor.

The second network node 112 is configured to perform the changing of Action 306, e.g., by means of a changing unit 702 within the second network node 112, configured to, change the first configuration of the target link, based on the update configured to be indicated by the transmitted indication. To change is configured to be performed only after receiving the confirmation of at least one of: i) from the wireless device 130, that the wireless device 130 has received the indication, and ii) from the first network node 111 configured to operate in the wireless communications network 100, that the first network node 111 has transmitted the indication to the wireless device 130. The changing unit 702 may be the processor 705 of the second network node 112, or an application running on such processor.

In some embodiments, the indication may be configured to be transmitted via the first network node 111.

In some embodiments, the network node 112 may be the second network node 112, and the second network node 112 may be further configured to perform the receiving of Action 301, e.g., by means of a receiving unit 703 within the second network node 112, configured to, receive, from the first network node 111, the first indication; the first indication may be configured to indicate the one or more conditions according to which the wireless device 130 is to execute the link switch from the source link to the target link. The receiving unit 703 may be the processor 705 of the second network node 112, or an application running on such processor.

In some embodiments, the second network node 112 may be further configured to perform the transmitting of Action 302, e.g. by means of the transmitting unit 701, configured to, transmit the second indication. The second indication may be configured to indicate the first timer, and the third indication. The third indication may be configured to indicate the one or more RACH configurations. Each of the one or more RACH configurations may be configured to be valid during different values of the first timer.

The switch may be configured to be based on one or more of the first indication, the second indication and the third indication.

The second indication may be configured to be comprised in an information element.

In some embodiments, the network node 112 may be the second network node 112, and the second network node 112 may be further configured to perform the receiving of Action 303, e.g., by means of the receiving unit 703, configured to, receive, from the first network node 111, the fourth indication. The fourth indication may be configured to indicate the second timer. Each of one or more RACH configurations configured to be allocated by the second network node 112, may be configured to be valid during different values of the second timer. The link switch may be configured to be based on the fourth indication.

Any of: the third indication and the fourth indication may be configured to be comprised in an information element.

The information element may be a MobilityControlInfo information element.

In some embodiments, the second timer may be configured to be based on one or more SFN periods.

In some embodiments, the second network node 112 may be further configured to perform the receiving of Action 305, e.g., by means of the receiving unit 703, configured to, receive the confirmation that at least one of: i) the wireless device 130 has received the indication, wherein the confirmation may be configured to be received from the wireless device 130, and wherein the confirmation may be configured to be received as a sixth indication 607 via the first network node 111, and ii) the first network node 111 has transmitted the indication to the wireless device 130, wherein the confirmation may be configured to be received from the first network node 111.

Other units 704 may be comprised in the second network node 112.

The embodiments herein in the second network node 112 may be implemented through one or more processors, such as a processor 705 in the second network node 112 depicted in FIG. 7a, together with computer program code for performing the functions and actions of the embodiments herein. A processor, as used herein, may be understood to be a hardware component. The program code mentioned above may also be provided as a computer program product, for instance in the form of a data carrier carrying computer program code for performing the embodiments herein when being loaded into the second network node 112. One such carrier may be in the form of a CD ROM disc. It is however feasible with other data carriers such as a memory stick. The computer program code may furthermore be provided as pure program code on a server and downloaded to the second network node 112.

The second network node 112 may further comprise a memory 706 comprising one or more memory units. The memory 706 is arranged to be used to store obtained information, store data, configurations, schedulings, and applications etc. to perform the methods herein when being executed in the second network node 112.

In some embodiments, the second network node 112 may receive information from, e.g., the first network node 111, or the wireless device 130, through a receiving port 707. In some embodiments, the receiving port 707 may be, for example, connected to one or more antennas in second network node 112. In other embodiments, the second network node 112 may receive information from another structure in the wireless communications network 100 through the receiving port 707. Since the receiving port 707 may be in communication with the processor 705, the receiving port 707 may then send the received information to the processor 705. The receiving port 707 may also be configured to receive other information.

The processor 705 in the second network node 112 may be further configured to transmit or send information to e.g., the first network node 111, the wireless device 130, or another structure in the wireless communications network 100, through a sending port 708, which may be in communication with the processor 705, and the memory 706.

Those skilled in the art will also appreciate that the transmitting unit 701, the changing unit 702, the receiving unit 703, and the other units 704 described above may refer to a combination of analog and digital circuits, and/or one or more processors configured with software and/or firmware, e.g., stored in memory, that, when executed by the one or more processors such as the processor 705, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different units 701-704 described above may be implemented as one or more applications running on one or more processors such as the processor 705.

Thus, the methods according to the embodiments described herein for the second network node 112 may be respectively implemented by means of a computer program 709 product, comprising instructions, i.e., software code portions, which, when executed on at least one processor 705, cause the at least one processor 705 to carry out the actions described herein, as performed by the second network node 112. The computer program 709 product may be stored on a computer-readable storage medium 710. The computer-readable storage medium 710, having stored thereon the computer program 709, may comprise instructions which, when executed on at least one processor 705, cause the at least one processor 705 to carry out the actions described herein, as performed by the second network node 112. In some embodiments, the computer-readable storage medium 710 may be a non-transitory computer-readable storage medium, such as a CD ROM disc, or a memory stick. In other embodiments, the computer program 709 product may be stored on a carrier containing the computer program 709 just described, wherein the carrier is one of an electronic signal, optical signal, radio signal, or the computer-readable storage medium 710, as described above.

The second network node 112 may comprise a communication interface configured to facilitate, or an interface unit to facilitate, communications between the second network node 112 and other nodes or devices, e.g., the first network node 111, the wireless device 130, or another structure. The interface may, for example, include a transceiver configured to transmit and receive radio signals over an air interface in accordance with a suitable standard.

In other embodiments, the second network node 112 may comprise the following arrangement depicted in FIG. 7b. The second network node 112 may comprise a processing circuitry 705, e.g., one or more processors such as the processor 705, in the second network node 112 and the memory 706. The second network node 112 may also comprise a radio circuitry 711, which may comprise e.g., the receiving port 707 and the sending port 708. The processing circuitry 705 may be configured to, or operable to, perform the method actions according to FIG. 3, FIG. 6, and/or FIGS. 11-15, in a similar manner as that described in relation to FIG. 7a. The radio circuitry 711 may be configured to set up and maintain at least a wireless connection with the second network node 112. Circuitry may be understood herein as a hardware component.

Hence, embodiments herein also relate to the second network node 112 operative to operate in the wireless communications network 100. The second network node 112 may comprise the processing circuitry 705 and the memory 706, said memory 706 containing instructions executable by said processing circuitry 705, whereby the second network node 112 is further operative to perform the actions described herein in relation to the second network node 112, e.g., in FIG. 3, FIG. 6, and/or FIGS. 11-15.

Figure 8:
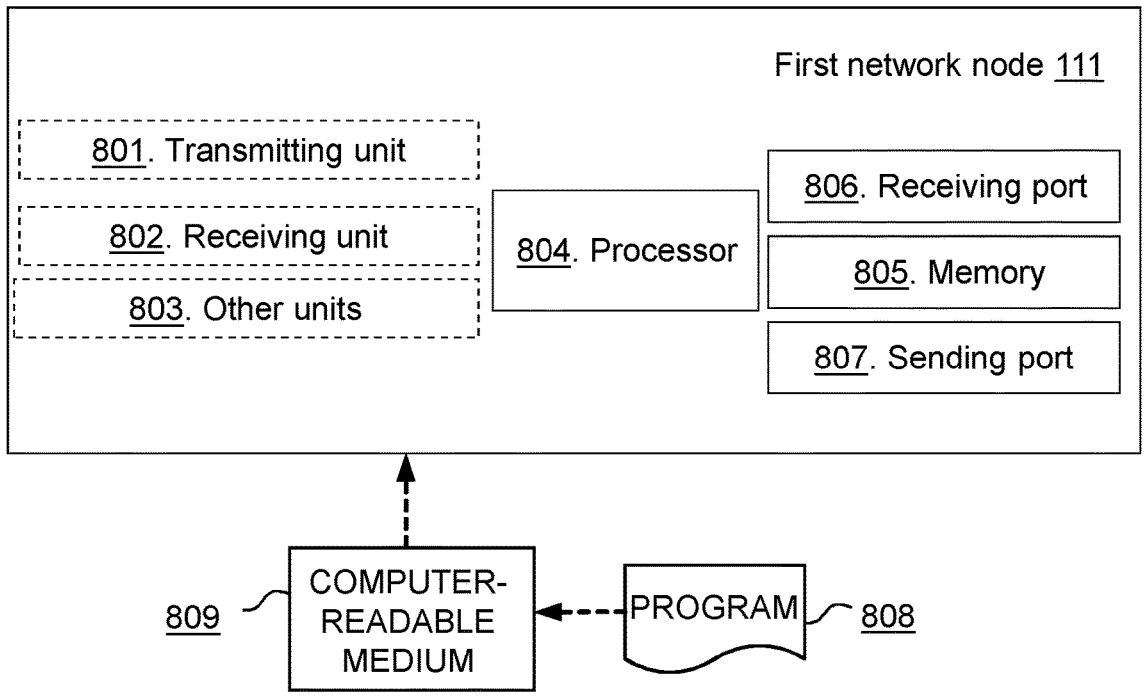
FIG. 8 is a schematic block diagram illustrating two non-limiting examples, a) and b), of a first network node, according to embodiments herein.
Figure 8:
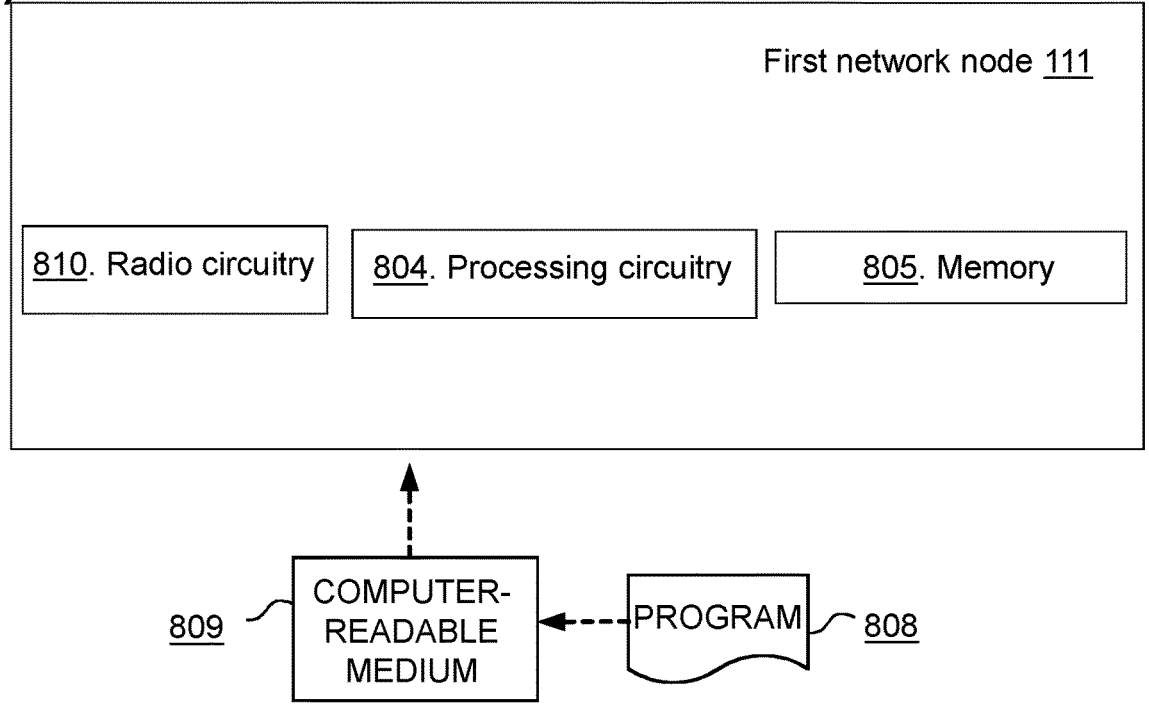

FIG. 8 depicts two different examples in panels a) and b), respectively, of the arrangement that the first network node 111 may comprise. In some embodiments, the first network node 111 may comprise the following arrangement depicted in FIG. 8a. The first network node 111 may be understood to be for handling the link switch of the wireless device 130 from the source link to the target link. The first network node 111 and the wireless device 130 may be configured to operate in the wireless communications network 100.

Several embodiments are comprised herein. It should be noted that the examples herein are not mutually exclusive. One or more embodiments may be combined, where applicable. All possible combinations are not described to simplify the description. Components from one embodiment may be tacitly assumed to be present in another embodiment and it will be obvious to a person skilled in the art how those components may be used in the other exemplary embodiments. In FIG. 8, optional units are indicated with dashed boxes.

The detailed description of some of the following corresponds to the same references provided above, in relation to the actions described for the second network node 112, and will thus not be repeated here. For example, in some examples, the first indication may be, or may be comprised in, a HO request or Early HO request message. The first network node 111 is configured to perform the transmitting of Action 404, e.g. by means of a transmitting unit 801 within the first network node 111, configured to given the first configuration of the target link indicating resources for the wireless device 130 to perform random access to the second network node 112, configured to operate in the wireless communications network 100, during the link switch from the source link to the target link, transmit, prior to the link switch, the indication from the second network node 112 to the wireless device 130. The indication is configured to indicate the update to the first configuration. The transmitting unit 801 may be a processor 804 of the second network node 112, or an application running on such processor.

The first network node 111 is also configured to perform the transmitting of Action 406, e.g., by means of the transmitting unit 801, configured to transmit, to the second network node 112 and prior to the link switch, the a confirmation of at least one of: i) from the wireless device 130, that the wireless device 130 has received the indication, and ii) from the first network node 111, that the first network node 111 has transmitted the indication to the wireless device 130. The confirmation is configured to be transmitted as the another indication 607.

The another indication 607 may be the sixth indication 607.

The first network node 111 may be further configured to perform the receiving of Action 405, e.g. by means of a receiving unit 802 within the first network node 111, configured to receive, from the wireless device 130, the confirmation that the wireless device 130 has received the indication as a seventh indication 606. The receiving unit 802 may be the processor 804 of the first network node 111, or an application running on such processor.

The first network node 111 may be further configured to perform the transmitting of Action 401, e.g. by means of the transmitting unit 801, configured to transmit, to the second network node 112, the first indication. The first indication may be configured to indicate the one or more conditions according to which the wireless device 130 is to execute the link switch from the source link to the target link. The transmitting unit 801 may be a processor 804 of the second network node 112, or an application running on such processor.

The first network node 111 may be further configured to perform the receiving of Action 402, e.g. by means of the receiving unit 802, configured to receive, from the second network node 112, the second indication. The second indication may be configured to indicate the first timer, and the third indication. The third indication may be configured to indicate the one or more RACH configurations. Each of the one or more RACH configurations may be configured to be valid during different values of the first timer. The link switch may be configured to be based on one or more of the first indication, the second indication and the third indication.

In some embodiments, the second indication may be configured to be comprised in an information element.

The first network node 111 may be further configured to perform the transmitting of Action 403, e.g. by means of the transmitting unit 801, configured to transmit, to the second network node 112, the fourth indication. The fourth indication may be configured to indicate the second timer. Each of one or more RACH configurations configured to be allocated by the second network node 112, may be configured to be valid during different values of the second timer. The link switch may be configured to be based on the fourth third indication.

Any of: the third indication and the fourth indication may be configured to be comprised in an information element.

The information element may be a MobilityControlInfo information element.

In some embodiments, the second timer may be configured to be based on one or more SFN periods.

Other units 803 may be comprised in the first network node 111.

The embodiments herein in the first network node 111 may be implemented through one or more processors, such as a processor 804 in the first network node 111 depicted in FIG. 8a, together with computer program code for performing the functions and actions of the embodiments herein. A processor, as used herein, may be understood to be a hardware component. The program code mentioned above may also be provided as a computer program product, for instance in the form of a data carrier carrying computer program code for performing the embodiments herein when being loaded into the first network node 111. One such carrier may be in the form of a CD ROM disc. It is however feasible with other data carriers such as a memory stick. The computer program code may furthermore be provided as pure program code on a server and downloaded to the first network node 111.

The first network node 111 may further comprise a memory 805 comprising one or more memory units. The memory 805 is arranged to be used to store obtained information, store data, configurations, schedulings, and applications etc. to perform the methods herein when being executed in the first network node 111.

In some embodiments, the first network node 111 may receive information from, e.g., the second network node 112, or the wireless device 130, through a receiving port 806. In some embodiments, the receiving port 806 may be, for example, connected to one or more antennas in first network node 111. In other embodiments, the first network node 111 may receive information from another structure in the wireless communications network 100 through the receiving port 806. Since the receiving port 806 may be in communication with the processor 804, the receiving port 806 may then send the received information to the processor 804. The receiving port 806 may also be configured to receive other information.

The processor 804 in the first network node 111 may be further configured to transmit or send information to e.g., the second network node 112, or the wireless device 130, or another structure in the wireless communications network 100, through a sending port 807, which may be in communication with the processor 804, and the memory 805.

Those skilled in the art will also appreciate that the transmitting unit 801, the receiving unit 802, and the other units 803 described above may refer to a combination of analog and digital circuits, and/or one or more processors configured with software and/or firmware, e.g., stored in memory, that, when executed by the one or more processors such as the processor 804, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different units 801-803 described above may be implemented as one or more applications running on one or more processors such as the processor 804.

Thus, the methods according to the embodiments described herein for the first network node 111 may be respectively implemented by means of a computer program 808 product, comprising instructions, i.e., software code portions, which, when executed on at least one processor 804, cause the at least one processor 804 to carry out the actions described herein, as performed by the first network node 111. The computer program 808 product may be stored on a computer-readable storage medium 809. The computer-readable storage medium 809, having stored thereon the computer program 808, may comprise instructions which, when executed on at least one processor 804, cause the at least one processor 804 to carry out the actions described herein, as performed by the first network node 111. In some embodiments, the computer-readable storage medium 809 may be a non-transitory computer-readable storage medium, such as a CD ROM disc, or a memory stick. In other embodiments, the computer program 808 product may be stored on a carrier containing the computer program 808 just described, wherein the carrier is one of an electronic signal, optical signal, radio signal, or the computer-readable storage medium 809, as described above.

The first network node 111 may comprise a communication interface configured to facilitate, or an interface unit to facilitate, communications between the first network node 111 and other nodes or devices, e.g., the second network node 112, the wireless device 130, or another structure. The interface may, for example, include a transceiver configured to transmit and receive radio signals over an air interface in accordance with a suitable standard.

In other embodiments, the first network node 111 may comprise the following arrangement depicted in FIG. 8*b*. The first network node 111 may comprise a processing circuitry 804, e.g., one or more processors such as the processor 804, in the first network node 111 and the memory 805. The first network node 111 may also comprise a radio circuitry 810, which may comprise e.g., the receiving port 806 and the sending port 807. The processing circuitry 804 may be configured to, or operable to, perform the method actions according to FIG. 4, FIG. 6, and/or FIGS. 11-15, in a similar manner as that described in relation to FIG. 8*a*. The radio circuitry 810 may be configured to set up and maintain at least a wireless connection with the first network node 111. Circuitry may be understood herein as a hardware component.

Hence, embodiments herein also relate to the first network node 111 operative to operate in the wireless communications network 100. The first network node 111 may comprise the processing circuitry 804 and the memory 805, said memory 805 containing instructions executable by said processing circuitry 804, whereby the first network node 111 is further operative to perform the actions described herein in relation to the first network node 111, e.g., in FIG. 4, FIG. 6, and/or FIGS. 11-15.

Figure 9:
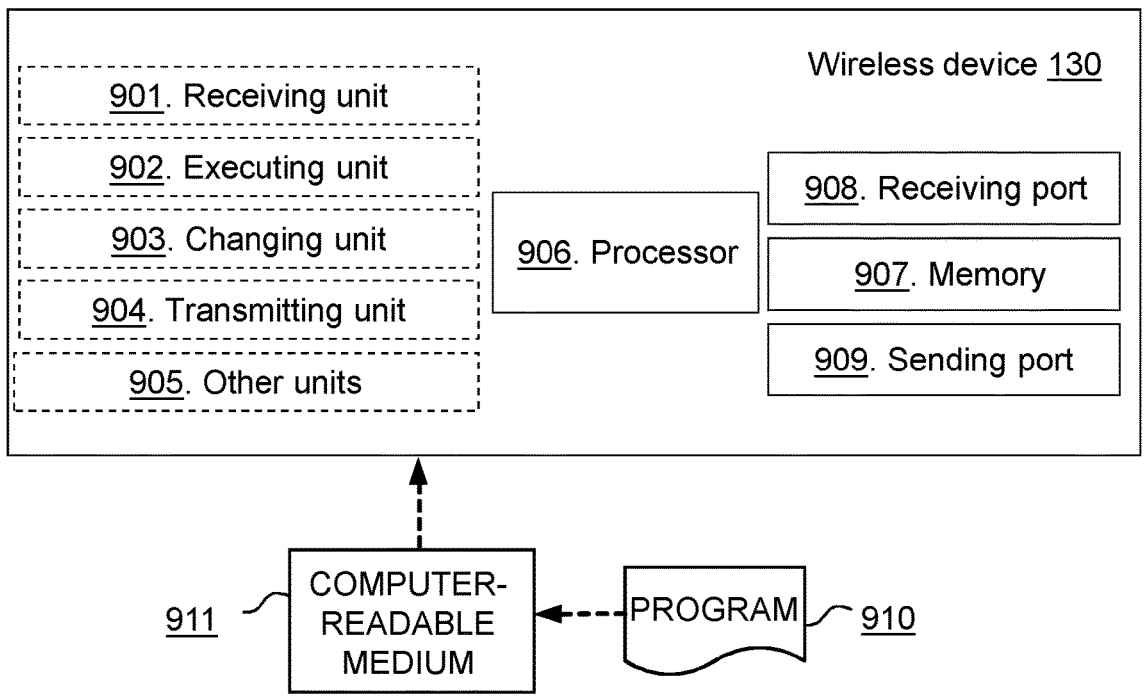
FIG. 9 is a schematic block diagram illustrating two non-limiting examples, a) and b), of a wireless device, according to embodiments herein.
Figure 9:
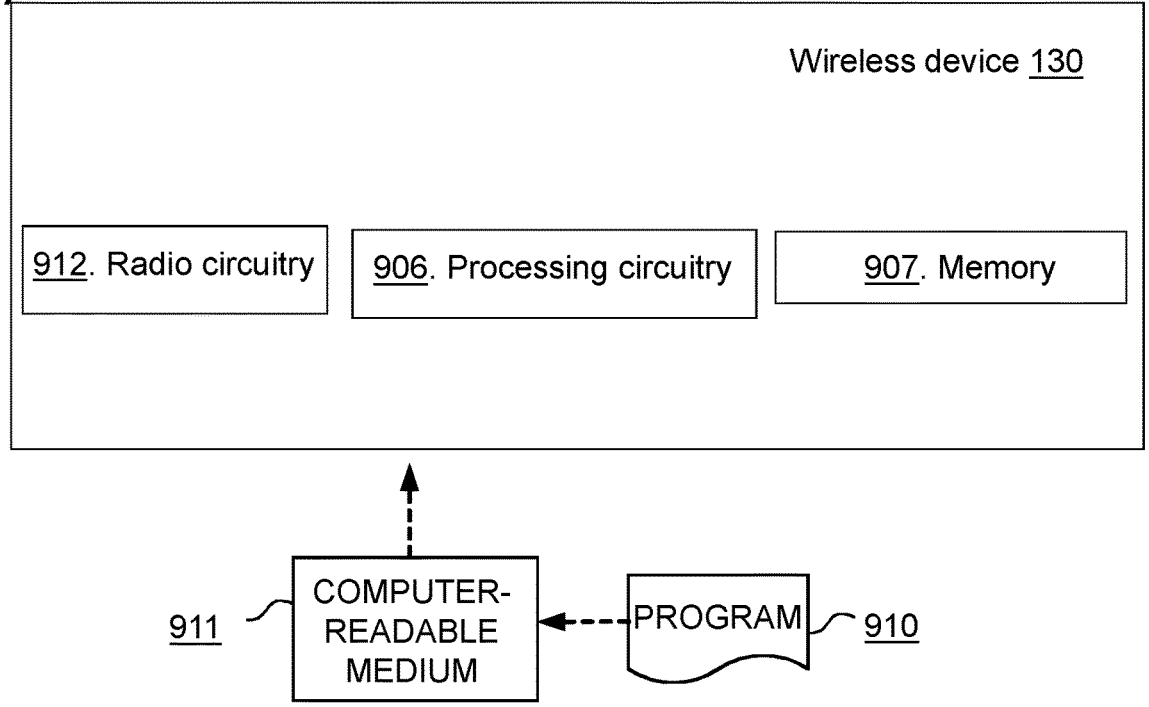

FIG. 9 depicts two different examples in panels a) and b), respectively, of the arrangement that the wireless device 130 may comprise. In some embodiments, the wireless device 130 may comprise the following arrangement depicted in FIG. 9*a*. The wireless device 130 may be understood to be for handling the link switch of the wireless device 130 from the source link to the target link. The wireless device 130 is configured to operate in the wireless communications network 100.

Several embodiments are comprised herein. It should be noted that the examples herein are not mutually exclusive. One or more embodiments may be combined, where applicable. All possible combinations are not described to simplify the description. Components from one embodiment may be tacitly assumed to be present in another embodiment and it will be obvious to a person skilled in the art how those components may be used in the other exemplary embodiments. In FIG. 9, optional units are indicated with dashed boxes.

The detailed description of some of the following corresponds to the same references provided above, in relation to the actions described for the second network node 112, and will thus not be repeated here. For example, in some examples, the first indication may be, or may be comprised in, a HO request or Early HO request message.

The wireless device 130 is configured to perform the receiving of Action 504 action, e.g. by means of receiving unit 901 within the wireless device 130, configured to given the first configuration of the target link indicating resources for the wireless device 130 to perform random access to the network node 112 during the link switch from the source link to the target link, the network node 112 being configured to operate in the wireless communications network 100, receive, prior to the link switch, the indication from the network node 112. The indication may be configured to indicate the update to the first configuration. The receiving unit 901 may be the processor 906 of the wireless device 130, or an application running on such processor.

The wireless device 130 is configured to perform the executing of Action 507, e.g., by means of an executing unit 902 within the wireless device 130, configured to execute the link switch, based on the update configured to be indicated by the received indication. To execute is configured to be performed only after transmitting the confirmation that the wireless device 130 has received the indication. The executing unit 902 may be the processor 906 of the wireless device 130, or an application running on such processor.

The wireless device 130 may be configured to perform the changing of Action 506, e.g., by means of a changing unit 903 within the wireless device 130, configured to change the first configuration of the target link, based on the update configured to be indicated by the received indication. To change may be configured to be performed only after transmitting the confirmation to the network node 112 that the wireless device 130 has received the indication. The changing unit 903 may be the processor 906 of the wireless device 130, or an application running on such processor.

In some embodiments, the network node 112 may be the second network node 112, and the indication may be configured to be received via the first network node 111 configured to operate in the wireless communications network 100.

In some embodiments, the wireless device 130 may be configured to perform the transmitting of Action 505, e.g., by means of a transmitting unit 904 within the wireless device 130, configured to transmit, to the second network node 112, the confirmation that the wireless device 130 has received the indication. The confirmation may be configured to be transmitted as the seventh indication 606. The confirmation may be configured to be transmitted via the first network node 111. The transmitting unit 904 may be a processor 906 of the wireless device 130, or an application running on such processor.

In some embodiments, the network node 112 may be the second network node 112, and the wireless device 130 may be further configured to perform the receiving of Action 501, e.g., by means of the receiving unit 901 configured to receive, from the first network node 111 configured to operate in the wireless communications network 100, the first indication. The first indication may be configured to indicate the one or more conditions according to which the wireless device 130 is to execute the link switch from the source link to the target link.

In some embodiments, the network node 112 may be the second network node 112, and the wireless device 130 may be further configured to perform the receiving of Action 502, e.g., by means of the receiving unit 901 configured to receive the second indication. The second indication may be configured to indicate the first timer, and the third indication. The third indication may be configured to indicate the one or more RACH configurations. Each of the one or more RACH configurations may be configured to be valid during different values of the first timer. The link switch may be configured to be based on one or more of the first indication, the second indication and the third indication.

The second indication may be configured to be comprised in an information element.

In some embodiments, the network node 112 may be the second network node 112, and the wireless device 130 may be further configured to perform the receiving of Action 503, e.g., by means of the receiving unit 901 configured to receive, from the first network node 111 configured to operate in the wireless communications network 100, the fourth indication. The fourth indication may be configured to indicate the second timer. Each of one or more RACH configurations configured to be allocated by the second network node 112, may be configured to be valid during different values of the second timer. The link switch may be configured to be based on the fourth indication.

In some embodiments, any of: the third indication and the fourth indication may be configured to be comprised in an information element.

In some embodiments, the information element may be configured to be a MobilityControlInfo information element.

In some embodiments, the second timer may be configured to be based on one or more SFN periods.

Other units 905 may be comprised in the wireless device 130.

The embodiments herein in the wireless device 130 may be implemented through one or more processors, such as a processor 906 in the wireless device 130 depicted in FIG. 9a, together with computer program code for performing the functions and actions of the embodiments herein. A processor, as used herein, may be understood to be a hardware component. The program code mentioned above may also be provided as a computer program product, for instance in the form of a data carrier carrying computer program code for performing the embodiments herein when being loaded into the wireless device 130. One such carrier may be in the form of a CD ROM disc. It is however feasible with other data carriers such as a memory stick. The computer program code may furthermore be provided as pure program code on a server and downloaded to the wireless device 130.

The wireless device 130 may further comprise a memory 907 comprising one or more memory units. The memory 907 is arranged to be used to store obtained information, store data, configurations, schedulings, and applications etc. to perform the methods herein when being executed in the wireless device 130.

In some embodiments, the wireless device 130 may receive information from, e.g., the second network node 112, or the first network node 111, through a receiving port 908. In some embodiments, the receiving port 908 may be, for example, connected to one or more antennas in wireless device 130. In other embodiments, the wireless device 130 may receive information from another structure in the wireless communications network 100 through the receiving port 908. Since the receiving port 908 may be in communication with the processor 906, the receiving port 908 may then send the received information to the processor 906. The receiving port 908 may also be configured to receive other information.

The processor 906 in the wireless device 130 may be further configured to transmit or send information to e.g., the second network node 112, or the first network node 111, or another structure in the wireless communications network 100, through a sending port 909, which may be in communication with the processor 906, and the memory 907.

Those skilled in the art will also appreciate that the receiving unit 901, the executing unit 902, the changing unit 903, the transmitting unit 904, and the other units 904 described above may refer to a combination of analog and digital circuits, and/or one or more processors configured with software and/or firmware, e.g., stored in memory, that, when executed by the one or more processors such as the processor 906, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different units 901-904 described above may be implemented as one or more applications running on one or more processors such as the processor 906.

Thus, the methods according to the embodiments described herein for the wireless device 130 may be respectively implemented by means of a computer program 910 product, comprising instructions, i.e., software code portions, which, when executed on at least one processor 906, cause the at least one processor 906 to carry out the actions described herein, as performed by the wireless device 130. The computer program 910 product may be stored on a computer-readable storage medium 911. The computer-readable storage medium 911, having stored thereon the computer program 910, may comprise instructions which, when executed on at least one processor 906, cause the at least one processor 906 to carry out the actions described herein, as performed by the wireless device 130. In some embodiments, the computer-readable storage medium 911 may be a non-transitory computer-readable storage medium, such as a CD ROM disc, or a memory stick. In other embodiments, the computer program 910 product may be stored on a carrier containing the computer program 910 just described, wherein the carrier is one of an electronic signal, optical signal, radio signal, or the computer-readable storage medium 911, as described above.

The wireless device 130 may comprise a communication interface configured to facilitate, or an interface unit to facilitate, communications between the wireless device 130 and other nodes or devices, e.g., the second network node 112, the wireless device 130, or another structure. The interface may, for example, include a transceiver configured to transmit and receive radio signals over an air interface in accordance with a suitable standard.

In other embodiments, the wireless device 130 may comprise the following arrangement depicted in FIG. 9b. The wireless device 130 may comprise a processing circuitry 906, e.g., one or more processors such as the processor 906, in the wireless device 130 and the memory 907. The wireless device 130 may also comprise a radio circuitry 912, which may comprise e.g., the receiving port 908 and the sending port 909. The processing circuitry 906 may be configured to, or operable to, perform the method actions according to FIG. 5, FIG. 6, and/or FIGS. 11-15, in a similar manner as that described in relation to FIG. 9a. The radio circuitry 912 may be configured to set up and maintain at least a wireless connection with the wireless device 130. Circuitry may be understood herein as a hardware component.

Hence, embodiments herein also relate to the wireless device 130 operative to operate in the wireless communications network 100. The wireless device 130 may comprise the processing circuitry 906 and the memory 907, said memory 907 containing instructions executable by said processing circuitry 906, whereby the wireless device 130 is further operative to perform the actions described herein in relation to the wireless device 130, e.g., in FIG. 5, FIG. 6, and/or FIGS. 11-15.

When using the word "comprise" or "comprising" it shall be interpreted as non-limiting, i.e. meaning "consist at least of".

A processor may be understood herein as a hardware component.

The embodiments herein are not limited to the above described preferred embodiments. Various alternatives, modifications and equivalents may be used. Therefore, the above embodiments should not be taken as limiting the scope of the invention.

As used herein, the expression "at least one of:" followed by a list of alternatives separated by commas, and wherein the last alternative is preceded by the "and" term, may be understood to mean that only one of the list of alternatives may apply, more than one of the list of alternatives may apply or all of the list of alternatives may apply. This expression may be understood to be equivalent to the expression "at least one of:" followed by a list of alternatives separated by commas, and wherein the last alternative is preceded by the "or" term.

Further Extensions and Variations

Figure 10:
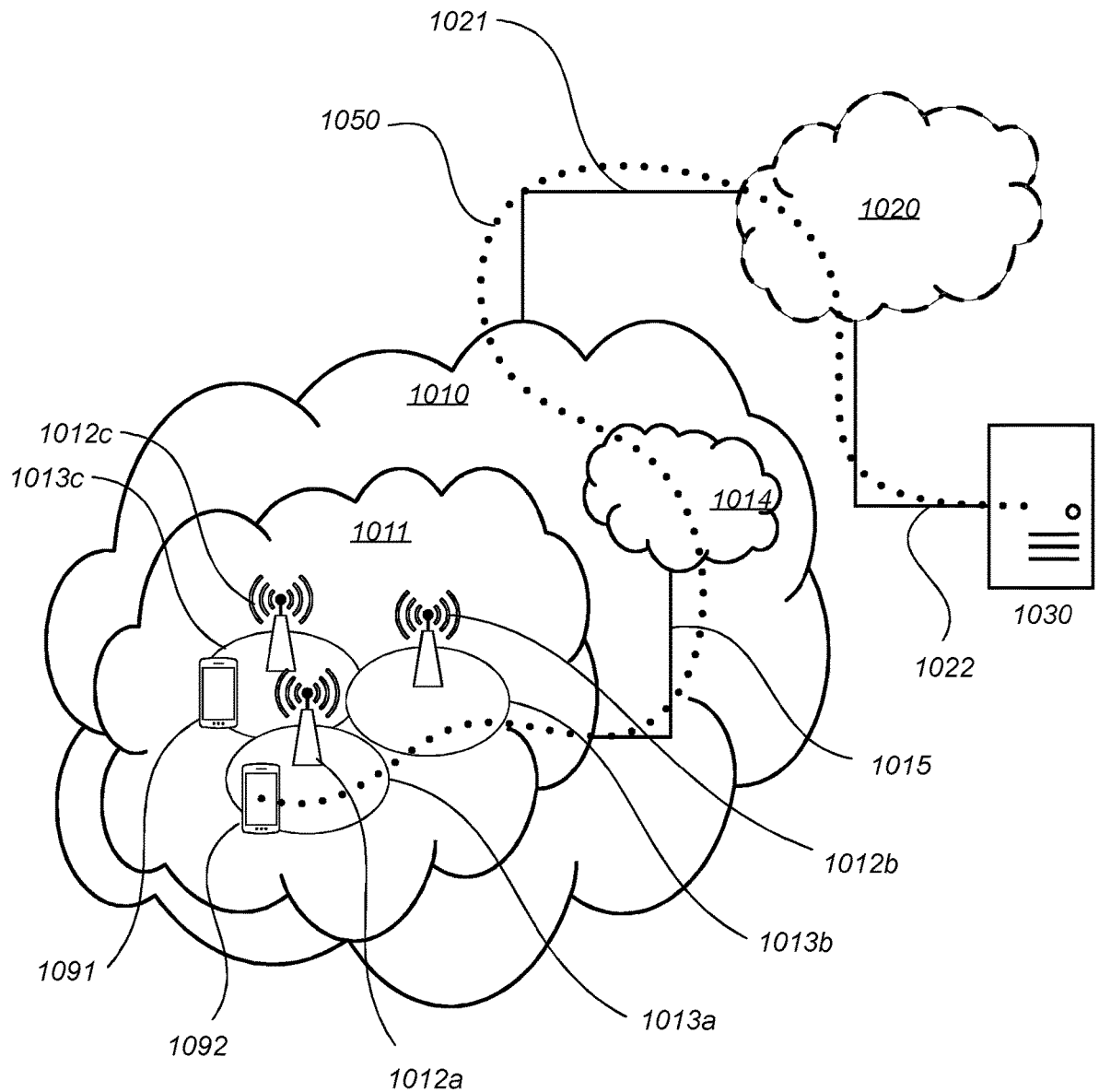
FIG. 10 is a schematic block diagram illustrating a telecommunication network connected via an intermediate network to a host computer, according to embodiments herein.

FIG. 10: Telecommunication Network Connected Via an Intermediate Network to a Host Computer in Accordance with Some Embodiments With reference to FIG. 10, in accordance with an embodiment, a communication system includes telecommunication network 1010 such as the wireless communications network 100, for example, a 3GPP-type cellular network, which comprises access network 1011, such as a radio access network, and core network 1014. Access network 1011 comprises a plurality of network nodes such as any, or both, of the first network node 111 and the second network node 112. For example, base stations 1012a, 1012b, 1012c, such as NBs, eNBs, gNBs or other types of wireless access points, each defining a corresponding coverage area 1013a, 1013b, 1013c. Each base station 1012a, 1012b, 1012c is connectable to core network 1014 over a wired or wireless connection 1015. A plurality of user equipments, such as the wireless device 130 may be comprised in the wireless communications network 100. In FIG. 10, a first UE 1091 located in coverage area 1013c is configured to wirelessly connect to, or be paged by, the corresponding base station 1012c. A second UE 1092 in coverage area 1013a is wirelessly connectable to the corresponding base station 1012a. While a plurality of UEs 1091, 1092 are illustrated in this example, the disclosed embodiments are equally applicable to a situation where a sole UE is in the coverage area or where a sole UE is connecting to the corresponding base station 1012. Any of the UEs 1091, 1092 may be considered examples of the wireless device 130.

Telecommunication network 1010 is itself connected to host computer 1030, which may be embodied in the hardware and/or software of a standalone server, a cloud-implemented server, a distributed server or as processing resources in a server farm. Host computer 1030 may be under the ownership or control of a service provider, or may be operated by the service provider or on behalf of the service provider. Connections 1021 and 1022 between telecommunication network 1010 and host computer 1030 may extend directly from core network 1014 to host computer 1030 or may go via an optional intermediate network 1020. Intermediate network 1020 may be one of, or a combination of more than one of, a public, private or hosted network; intermediate network 1020, if any, may be a backbone network or the Internet; in particular, intermediate network 1020 may comprise two or more sub-networks (not shown).

The communication system of FIG. 10 as a whole enables connectivity between the connected UEs 1091, 1092 and host computer 1030. The connectivity may be described as an over-the-top (OTT) connection 1050. Host computer 1030 and the connected UEs 1091, 1092 are configured to communicate data and/or signaling via OTT connection 1050, using access network 1011, core network 1014, any intermediate network 1020 and possible further infrastructure (not shown) as intermediaries. OTT connection 1050 may be transparent in the sense that the participating communication devices through which OTT connection 1050 passes are unaware of routing of uplink and downlink communications. For example, base station 1012 may not or need not be informed about the past routing of an incoming downlink communication with data originating from host computer 1030 to be forwarded (e.g., handed over) to a connected UE 1091. Similarly, base station 1012 need not be aware of the future routing of an outgoing uplink communication originating from the UE 1091 towards the host computer 1030.

In relation to FIGS. 11, 12, 13, 14, and 15, which are described next, it may be understood that a UE is an example of the wireless device 130, and that any description provided for the UE equally applies to the wireless device 130. It may be also understood that the base station may be considered an example of any, or both, of the first network node 111 and the second network node 112, and that any description provided for the base station equally applies to any, or both, of the first network node 111 and the second network node 112.

Figure 11:
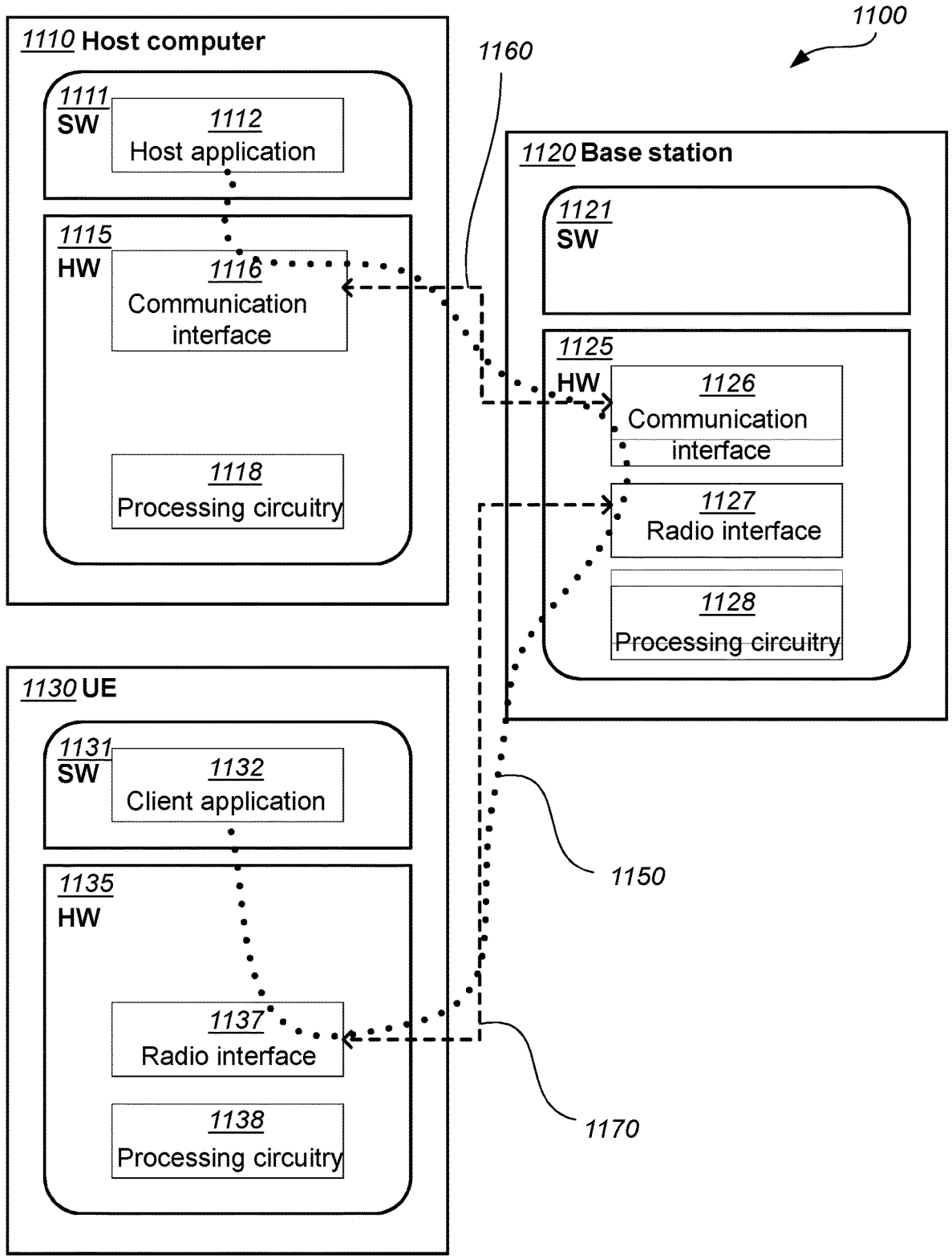
FIG. 11 is a generalized block diagram of a host computer communicating via a base station with a user equipment over a partially wireless connection, according to embodiments herein.

FIG. 11: Host Computer Communicating Via a Base Station with a User Equipment Over a Partially Wireless Connection in Accordance with Some Embodiments Example implementations, in accordance with an embodiment, of the wireless device 130, e.g., a UE, and any, or both, of the first network node 111 and the second network node 112, e.g., a base station and host computer discussed in the preceding paragraphs will now be described with reference to FIG. 11. In communication system 1100, such as the wireless communications network 100, host computer 1110 comprises hardware 1115 including communication interface 1116 configured to set up and maintain a wired or wireless connection with an interface of a different communication device of communication system 1100. Host computer 1110 further comprises processing circuitry 1118, which may have storage and/or processing capabilities. In particular, processing circuitry 1118 may comprise one or more programmable processors, application-specific integrated circuits, field programmable gate arrays or combinations of these (not shown) adapted to execute instructions. Host computer 1110 further comprises software 1111, which is stored in or accessible by host computer 1110 and executable by processing circuitry 1118. Software 1111 includes host application 1112. Host application 1112 may be operable to provide a service to a remote user, such as UE 1130 connecting via OTT connection 1150 terminating at UE 1130 and host computer 1110. In providing the service to the remote user, host application 1112 may provide user data which is transmitted using OTT connection 1150.

Communication system 1100 further includes any, or both, of the first network node 111 and the second network node 112, exemplified in FIG. 11 as a base station 1120 provided in a telecommunication system and comprising hardware 1125 enabling it to communicate with host computer 1110 and with UE 1130. Hardware 1125 may include communication interface 1126 for setting up and maintaining a wired or wireless connection with an interface of a different communication device of communication system 1100, as well as radio interface 1127 for setting up and maintaining at least wireless connection 1170 with the wireless device 130, exemplified in FIG. 11 as a UE 1130 located in a coverage area (not shown in FIG. 11) served by base station 1120. Communication interface 1126 may be configured to facilitate connection 1160 to host computer 1110. Connection 1160 may be direct or it may pass through a core network (not shown in FIG. 11) of the telecommunication system and/or through one or more intermediate networks outside the telecommunication system. In the embodiment shown, hardware 1125 of base station 1120 further includes processing circuitry 1128, which may comprise one or more programmable processors, application-specific integrated circuits, field programmable gate arrays or combinations of these (not shown) adapted to execute instructions. Base station 1120 further has software 1121 stored internally or accessible via an external connection.

Communication system 1100 further includes UE 1130 already referred to. Its hardware 1135 may include radio interface 1137 configured to set up and maintain wireless connection 1170 with a base station serving a coverage area in which UE 1130 is currently located. Hardware 1135 of UE 1130 further includes processing circuitry 1138, which may comprise one or more programmable processors, application-specific integrated circuits, field programmable gate arrays or combinations of these (not shown) adapted to execute instructions. UE 1130 further comprises software 1131, which is stored in or accessible by UE 1130 and executable by processing circuitry 1138. Software 1131 includes client application 1132. Client application 1132 may be operable to provide a service to a human or non-human user via UE 1130, with the support of host computer 1110. In host computer 1110, an executing host application 1112 may communicate with the executing client application 1132 via OTT connection 1150 terminating at UE 1130 and host computer 1110. In providing the service to the user, client application 1132 may receive request data from host application 1112 and provide user data in response to the request data. OTT connection 1150 may transfer both the request data and the user data. Client application 1132 may interact with the user to generate the user data that it provides.

It is noted that host computer 1110, base station 1120 and UE 1130 illustrated in FIG. 11 may be similar or identical to host computer 1030, one of base stations 1012*a*, 1012*b*, 1012*c* and one of UEs 1091, 1092 of FIG. 10, respectively. This is to say, the inner workings of these entities may be as shown in FIG. 11 and independently, the surrounding network topology may be that of FIG. 10.

In FIG. 11, OTT connection 1150 has been drawn abstractly to illustrate the communication between host computer 1110 and UE 1130 via base station 1120, without explicit reference to any intermediary devices and the precise routing of messages via these devices. Network infrastructure may determine the routing, which it may be configured to hide from UE 1130 or from the service provider operating host computer 1110, or both. While OTT connection 1150 is active, the network infrastructure may further take decisions by which it dynamically changes the routing (e.g., on the basis of load balancing consideration or reconfiguration of the network).

Wireless connection 1170 between UE 1130 and base station 1120 is in accordance with the teachings of the embodiments described throughout this disclosure. One or more of the various embodiments improve the performance of OTT services provided to UE 1130 using OTT connection 1150, in which wireless connection 1170 forms the last segment. More precisely, the teachings of these embodiments may improve the spectrum efficiency, and latency, and thereby provide benefits such as reduced user waiting time, better responsiveness and extended battery lifetime.

A measurement procedure may be provided for the purpose of monitoring data rate, latency and other factors on which the one or more embodiments improve. There may further be an optional network functionality for reconfiguring OTT connection 1150 between host computer 1110 and UE 1130, in response to variations in the measurement results. The measurement procedure and/or the network functionality for reconfiguring OTT connection 1150 may be implemented in software 1111 and hardware 1115 of host computer 1110 or in software 1131 and hardware 1135 of UE 1130, or both. In embodiments, sensors (not shown) may be deployed in or in association with communication devices through which OTT connection 1150 passes; the sensors may participate in the measurement procedure by supplying values of the monitored quantities exemplified above, or supplying values of other physical quantities from which software 1111, 1131 may compute or estimate the monitored quantities. The reconfiguring of OTT connection 1150 may include message format, retransmission settings, preferred routing etc.; the reconfiguring need not affect base station 1120, and it may be unknown or imperceptible to base station 1120. Such procedures and functionalities may be known and practiced in the art. In certain embodiments, measurements may involve proprietary UE signaling facilitating host computer 1110's measurements of throughput, propagation times, latency and the like. The measurements may be implemented in that software 1111 and 1131 causes messages to be transmitted, in particular empty or 'dummy' messages, using OTT connection 1150 while it monitors propagation times, errors etc.

The second network node 112 embodiments relate to FIG. 3, FIG. 6, FIG. 7 and FIGS. 10-15.

The second network node 112 may also be configured to communicate user data with a host application unit in a host computer 1110, e.g., via another link such as 1150.

The second network node 112 may comprise an interface unit to facilitate communications between the second network node 112 and other nodes or devices, e.g., the first network node 111, the wireless device 130, the host computer 1110, or any of the other nodes. In some particular examples, the interface may, for example, include a transceiver configured to transmit and receive radio signals over an air interface in accordance with a suitable standard.

The second network node 112 may comprise an arrangement as shown in FIG. 7 or in FIG. 11.

The first network node 111 embodiments relate to FIG. 4, FIG. 6, FIG. 8 and FIGS. 10-15.

The first network node 111 may also be configured to communicate user data with a host application unit in a host computer 1110, e.g., via another link such as 1150.

The first network node 111 may comprise an interface unit to facilitate communications between the first network node 111 and other nodes or devices, e.g., the second network node 112, the wireless device 130, the host computer 1110, or any of the other nodes. In some particular examples, the interface may, for example, include a transceiver configured to transmit and receive radio signals over an air interface in accordance with a suitable standard.

The first network node 111 may comprise an arrangement as shown in FIG. 8 or in FIG. 11.

The wireless device 130 embodiments relate to FIG. 5, FIG. 6, FIG. 9 and FIGS. 10-15.

The wireless device 130 may also be configured to communicate user data with a host application unit in a host computer 1110, e.g., via another link such as 1150.

The wireless device 130 may comprise an interface unit to facilitate communications between the wireless device 130 and other nodes or devices, e.g., the first network node 111, the second network node 112, the wireless device 130, the host computer 1110, or any of the other nodes. In some particular examples, the interface may, for example, include a transceiver configured to transmit and receive radio signals over an air interface in accordance with a suitable standard.

The wireless device 130 may comprise an arrangement as shown in FIG. 9 or in FIG. 11.

FIG. 12: Methods Implemented in a Communication System Including a Host Computer, a Base Station and a User Equipment in Accordance with Some Embodiments FIG. 12 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 12 will be included in this section. In step 1210, the host computer provides user data. In substep 1211 (which may be optional) of step 1210, the host computer provides the user data by executing a host application. In step 1220, the host computer initiates a transmission carrying the user data to the UE. In step 1230 (which may be optional), the base station transmits to the UE the user data which was carried in the transmission that the host computer initiated, in accordance with the teachings of the embodiments described throughout this disclosure. In step 1240 (which may also be optional), the UE executes a client application associated with the host application executed by the host computer.

FIG. 13: Methods Implemented in a Communication System Including a Host Computer, a Base Station and a User Equipment in Accordance with Some Embodiments FIG. 13 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 13 will be included in this section. In step 1310 of the method, the host computer provides user data. In an optional substep (not shown) the host computer provides the user data by executing a host application. In step 1320, the host computer initiates a transmission carrying the user data to the UE. The transmission may pass via the base station, in accordance with the teachings of the embodiments described throughout this disclosure. In step 1330 (which may be optional), the UE receives the user data carried in the transmission.

FIG. 14: Methods Implemented in a Communication System Including a Host Computer, a Base Station and a User Equipment in Accordance with Some Embodiments FIG. 14 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 14 will be included in this section. In step 1410 (which may be optional), the UE receives input data provided by the host computer. Additionally or alternatively, in step 1420, the UE provides user data. In substep 1421 (which may be optional) of step 1420, the UE provides the user data by executing a client application. In substep 1411 (which may be optional) of step 1410, the UE executes a client application which provides the user data in reaction to the received input data provided by the host computer. In providing the user data, the executed client application may further consider user input received from the user. Regardless of the specific manner in which the user data was provided, the UE initiates, in substep 1430 (which may be optional), transmission of the user data to the host computer. In step 1440 of the method, the host computer receives the user data transmitted from the UE, in accordance with the teachings of the embodiments described throughout this disclosure.

FIG. 15: Methods Implemented in a Communication System Including a Host Computer, a Base Station and a User Equipment in Accordance with Some Embodiments FIG. 15 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 15 will be included in this section. In step 1510 (which may be optional), in accordance with the teachings of the embodiments described throughout this disclosure, the base station receives user data from the UE. In step 1520 (which may be optional), the base station initiates transmission of the received user data to the host computer. In step 1530 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Further Numbered Embodiments

1. A base station configured to communicate with a user equipment (UE), the base station comprising a radio interface and processing circuitry configured to perform one or more of the actions described herein as performed by any of the first network node 111 and the second network node 112.
5. A communication system including a host computer comprising:
   processing circuitry configured to provide user data; and
   a communication interface configured to forward the user data to a cellular network for transmission to a user equipment (UE),
   wherein the cellular network comprises a base station having a radio interface and processing circuitry, the base station's processing circuitry configured to perform one or more of the actions described herein as performed by any of the first network node 111 and the second network node 112.
6. The communication system of embodiment 5, further including the base station.
7. The communication system of embodiment 6, further including the UE, wherein the UE is configured to communicate with the base station.
8. The communication system of embodiment 7, wherein:
   the processing circuitry of the host computer is configured to execute a host application, thereby providing the user data; and
   the UE comprises processing circuitry configured to execute a client application associated with the host application.
11. A method implemented in a base station, comprising one or more of the actions described herein as performed by any of the first network node 111 and the second network node 112.
15. A method implemented in a communication system including a host computer, a base station and a user equipment (UE), the method comprising:
   at the host computer, providing user data; and
   at the host computer, initiating a transmission carrying the user data to the UE via a cellular network comprising the base station, wherein the base station performs one or more of the actions described herein as performed by any of the first network node 111 and the second network node 112.
16. The method of embodiment 15, further comprising:
   at the base station, transmitting the user data.
17. The method of embodiment 16, wherein the user data is provided at the host computer by executing a host application, the method further comprising:
   at the UE, executing a client application associated with the host application.
21. A user equipment (UE) configured to communicate with a base station, the UE comprising a radio interface and processing circuitry configured to perform one or more of the actions described herein as performed by the wireless device 130.
25. A communication system including a host computer comprising:
   processing circuitry configured to provide user data; and
   a communication interface configured to forward user data to a cellular network for transmission to a user equipment (UE),
   wherein the UE comprises a radio interface and processing circuitry, the UE's processing circuitry configured to perform one or more of the actions described herein as performed by the wireless device 130.
26. The communication system of embodiment 25, further including the UE.
27. The communication system of embodiment 26, wherein the cellular network further includes a base station configured to communicate with the UE.
28. The communication system of embodiment 26 or 27, wherein:
   the processing circuitry of the host computer is configured to execute a host application, thereby providing the user data; and
   the UE's processing circuitry is configured to execute a client application associated with the host application.
31. A method implemented in a user equipment (UE), comprising one or more of the actions described herein as performed by the wireless device 130.
35. A method implemented in a communication system including a host computer, a base station and a user equipment (UE), the method comprising:
   at the host computer, providing user data; and
   at the host computer, initiating a transmission carrying the user data to the UE via a cellular network comprising the base station, wherein the UE performs one or more of the actions described herein as performed by the wireless device 130.

36. The method of embodiment 35, further comprising:
   at the UE, receiving the user data from the base station.

41. A user equipment (UE) configured to communicate with a base station, the UE comprising a radio interface and processing circuitry configured to perform one or more of the actions described herein as performed by the wireless device 130.

45. A communication system including a host computer comprising:
   a communication interface configured to receive user data originating from a transmission from a user equipment (UE) to a base station,
   wherein the UE comprises a radio interface and processing circuitry, the UE's processing circuitry configured to: perform one or more of the actions described herein as performed by the wireless device 130.

46. The communication system of embodiment 45, further including the UE.

47. The communication system of embodiment 46, further including the base station, wherein the base station comprises a radio interface configured to communicate with the UE and a communication interface configured to forward to the host computer the user data carried by a transmission from the UE to the base station.

48. The communication system of embodiment 46 or 47, wherein:
   the processing circuitry of the host computer is configured to execute a host application; and
   the UE's processing circuitry is configured to execute a client application associated with the host application, thereby providing the user data.

49. The communication system of embodiment 46 or 47, wherein:
   the processing circuitry of the host computer is configured to execute a host application, thereby providing request data; and
   the UE's processing circuitry is configured to execute a client application associated with the host application, thereby providing the user data in response to the request data.

51. A method implemented in a user equipment (UE), comprising one or more of the actions described herein as performed by the wireless device 130.

52. The method of embodiment 51, further comprising:
   providing user data; and
   forwarding the user data to a host computer via the transmission to the base station.

55. A method implemented in a communication system including a host computer, a base station and a user equipment (UE), the method comprising:
   at the host computer, receiving user data transmitted to the base station from the UE, wherein the UE performs one or more of the actions described herein as performed by the wireless device 130.

56. The method of embodiment 55, further comprising:
   at the UE, providing the user data to the base station.

57. The method of embodiment 56, further comprising:
   at the UE, executing a client application, thereby providing the user data to be transmitted; and
   at the host computer, executing a host application associated with the client application.

58. The method of embodiment 56, further comprising:
   at the UE, executing a client application; and
   at the UE, receiving input data to the client application, the input data being provided at the host computer by executing a host application associated with the client application,
   wherein the user data to be transmitted is provided by the client application in response to the input data.

61. A base station configured to communicate with a user equipment (UE), the base station comprising a radio interface and processing circuitry configured to perform one or more of the actions described herein as performed by any of the first network node 111 and the second network node 112.

65. A communication system including a host computer comprising a communication interface configured to receive user data originating from a transmission from a user equipment (UE) to a base station, wherein the base station comprises a radio interface and processing circuitry, the base station's processing circuitry configured to perform one or more of the actions described herein as performed by any of the first network node 111 and the second network node 112.

66. The communication system of embodiment 65, further including the base station.

67. The communication system of embodiment 66, further including the UE, wherein the UE is configured to communicate with the base station.

68. The communication system of embodiment 67, wherein:
   the processing circuitry of the host computer is configured to execute a host application;
   the UE is configured to execute a client application associated with the host application, thereby providing the user data to be received by the host computer.

71. A method implemented in a base station, comprising one or more of the actions described herein as performed by any of the first network node 111 and the second network node 112.

75. A method implemented in a communication system including a host computer, a base station and a user equipment (UE), the method comprising:
   at the host computer, receiving, from the base station, user data originating from a transmission which the base station has received from the UE, wherein the UE performs one or more of the actions described herein as performed by the wireless device 130.

76. The method of embodiment 75, further comprising:
   at the base station, receiving the user data from the UE.

77. The method of embodiment 76, further comprising:
   at the base station, initiating a transmission of the received user data to the host computer.

Abbreviations

At least some of the following abbreviations may be used in this disclosure. If there is an inconsistency between abbreviations, preference should be given to how it is used above. If listed multiple times below, the first listing should be preferred over any subsequent listing(s).
3GPP 3rd Generation Partnership Project
5G 5th Generation
5GCN 5G Core Network
ANR Automatic Neighbor Relations
CRS Cell Reference Signal
DC Dual Connectivity
EPC Evolved Packet Core
EN-DC Eutran-NR Dual Connectivity
eNB RAN node (RBS) supporting LTE radio access technology
gNB RAN node (RBS) supporting NR radio access technology
HO Handover
KPI Key Performance Indicator
LTE Long Term Evolution MCG Master Cell Group (related to master node in dual connectivity)
MeNB Master eNB
NR New Radio (5G)
NCGI NR Cell Global Identity
NSA Non-Stand-alone NR
OAM Operation And Management
PCI Physical Cell Identity
PSS Primary Synchronization Signal
RACH Random Access Channel
RAN Radio Access Network
RAT Radio Access Technology
RLF Radio Link Failure
RSRP Reference Signal Received Power
RSRQ Reference Signal Received Quality
SA Stand-alone NR
SINR Signal to Interference and noise ratio
SSS Secondary Synchronization Signal
UE User Equipment

The invention claimed is:

1. A method, performed by a wireless device, for handling a link switch of the wireless device from a source link to a target link, the wireless device operating in a wireless communications network, the method comprising:
given a first configuration of the target link, indicating resources for the wireless device to perform random access to a network node during the link switch from the source link to the target link;
receiving, prior to the link switch, an indication from the network node, the indication indicating an update to the first configuration;
transmitting a confirmation to the network node that the indication has been received to trigger the network node to update the first configuration;
executing the link switch, based on the update indicated by the received indication, the executing being performed only after transmitting a confirmation that the wireless device has received the indication;
the network node being a second network node, and the indication being received via a first network node operating in the wireless communications network;
transmitting, to the second network node, the confirmation that the wireless device has received the indication, the confirmation being transmitted as a seventh indication; and
the confirmation being transmitted via the first network node.

2. The method according to claim 1, further comprising:
changing the first configuration of the target link, based on the update indicated by the received indication, wherein the changing is performed only after transmitting a confirmation to the network node that the wireless device has received the indication.

3. The method according to claim 1, wherein the network node is a second network node, and wherein the method further comprises:
receiving, from the first network node operating in the wireless communications network, a first indication, the first indication indicating one or more conditions according to which the wireless device is to execute the link switch from the source link to the target link; and
receiving a second indication, the second indication indicating a first timer, and a third indication, the third indication indicating at least one Random Access Channel, RACH, configuration, each of the at least one RACH configuration being valid during different values of the first timer,
wherein the link switch is based on at least one of the first indication, the second indication and the third indication.

4. The method according to claim 3, wherein the second indication is comprised in an information element.

5. The method according to claim 1, wherein the method further comprises:
receiving from the first network node operating in the wireless communications network, a fourth indication, the fourth indication indicating a second timer, wherein each of at least one random access channel (RACH) configuration allocated by the second network node is valid during different values of the second timer,
wherein the link switch is based on the fourth indication.

6. A wireless device, for handling a link switch of the wireless device from a source link to a target link, the wireless device being configured to operate in a wireless communications network, the wireless device comprising processing circuitry and a radio interface configured to:
given a first configuration of the target link indicating resources for the wireless device to perform random access to a network node during the link switch from the source link to the target link;
receive, prior to the link switch, an indication from the network node, the indication being configured to indicate an update to the first configuration;
transmit a confirmation to the network node that the indication has been received to trigger the network node to update the first configuration;
execute the link switch, based on the update configured to be indicated by the received indication, the executing being configured to be performed only after transmitting a confirmation that the wireless device has received the indication;
the network node being a second network node, and the indication being received via a first network node operating in the wireless communications network;
transmit, to the second network node, the confirmation that the wireless device has received the indication, the confirmation being transmitted as a seventh indication; and
the confirmation being transmitted via the first network node.

* * * * *